United States Patent
Paravada et al.

(10) Patent No.: US 10,078,611 B1
(45) Date of Patent: Sep. 18, 2018

(54) SMART HANDLING OF INPUT/OUTPUT INTERRUPTS

(71) Applicant: QUALCOMM Incorporated, San Diego, CA (US)

(72) Inventors: Surendra Paravada, Hyderabad (IN); Madhu Yashwanth Boenapalli, Hyderabad (IN); Venu Madhav Mokkapati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/626,544

(22) Filed: Jun. 19, 2017

(51) Int. Cl.
  *G06F 13/24* (2006.01)
  *G06F 13/40* (2006.01)
  *G06F 13/28* (2006.01)
  *G06F 13/20* (2006.01)

(52) U.S. Cl.
  CPC ............ *G06F 13/409* (2013.01); *G06F 13/20* (2013.01); *G06F 13/28* (2013.01)

(58) Field of Classification Search
  CPC ...................................................... G06F 13/24
  See application file for complete search history.

(56) References Cited

U.S. PATENT DOCUMENTS

| | | | | |
|---|---|---|---|---|
| 5,825,674 A | * | 10/1998 | Jackson | G06F 1/206 713/321 |
| 2011/0113164 A1 | | 5/2011 | Venkatsuresh et al. | |
| 2012/0262592 A1 | | 10/2012 | Rabii | |
| 2013/0019117 A1 | | 1/2013 | Michalak et al. | |
| 2013/0254563 A1 | | 9/2013 | Culbert et al. | |
| 2015/0220464 A1 | | 8/2015 | Heisswolf et al. | |
| 2017/0262392 A1 | * | 9/2017 | Tamura | G06F 13/22 |

* cited by examiner

*Primary Examiner* — Farley Abad
(74) *Attorney, Agent, or Firm* — The Marbury Law Group, PLLC

(57) ABSTRACT

Aspects include computing devices and methods implemented by computing devices for smart of handling input/output interrupts associated with device setting levels. Various aspects may include receiving a hardware input/output interrupt from a hardware interface, updating an adjusted feature setting level, determining whether the adjusted feature setting level equals a feature setting level limit, and changing an interrupt service routine address stored at a first location of a hardware input/output register corresponding with an interrupt service routine associated with the hardware input/output interrupt to a first data in response to determining that the adjusted feature setting level of the computing device equals the adjusted feature setting level limit.

20 Claims, 16 Drawing Sheets

SMART HANDLING OF INPUT/OUTPUT INTERRUPTS

BACKGROUND

A key design consideration of mobile devices is battery life. Mobile devices employ various optimizations and features to extend battery life. Some such optimizations and features are enabled for low charge states of a battery to extend the amount of time the remaining charge can be used to power the mobile device. However, various hardware or software modules of the mobile devices are power hungry and drain unnecessary power irrespective of the battery charge state.

Actuating a hardware input/output interface on a mobile device (e.g., by pressing a button or touch screen icon) causes an interrupt service routine/hardware to generate an interrupt that causes a mobile device processor to execute a function associated with the hardware input/output interface (the "hardware function"). For example, the volume buttons on a smartphone—pressing an up-volume button generates an interrupt causing the processor to jump to an address (stored in a register) of an interrupt service routine that the processor executes to prompt execution of the hardware function to increase a volume setting. If the volume setting is already at a maximum, further presses of the button interrupt the processor to perform the volume-up hardware function but the processor cannot change the setting. Even though no action is taken, the button press has nevertheless interrupted the processor. The processor also likely implements ancillary functions related to the hardware function, such as turning on a display. Generating and processing the interrupts and implementing the hardware function and ancillary functions requires processor cycles and power for components, such as the display, which results in power consumption from a battery of the mobile device. When settings are at a limit, responding to the interrupt causes needless cycling of the processor and battery drain.

SUMMARY

Various aspects may include computing devices and methods for implementing smart handling of input/output interrupts on the computing device, such as a mobile computing device. Various aspects may include determining whether an adjusted feature setting level of a feature setting equals a first feature setting level limit, and storing a null or no operation instruction at a first location of a hardware input/output register corresponding with an interrupt service routine associated with hardware input/output interrupt in response to determining that the adjusted feature setting level equals the first feature setting level limit. Some aspects may further include changing data stored at the first location of the hardware input/output register to the interrupt service routine address in response to determining that the adjusted feature setting level no longer equals the first feature setting level limit.

In some aspects, changing data stored at the first location of the hardware input/output register to the interrupt service routine address in response to determining that the adjusted feature setting level no longer equals the first feature setting level limit may include determining whether the adjusted feature setting level moved away from a complement feature setting limit that is on an opposite end of a permissible range of the feature setting level from the first feature setting level limit, and storing an address for a complement interrupt service routine corresponding to the feature setting in a second location of the hardware input/output register corresponding to interrupts for the complement interrupt service routine in response to determining that the adjusted feature setting level moved away from the complement feature setting limit.

Some aspects may further include retrieving data stored at the first location of the hardware input/output register, performing no operation if a null or no operation instruction is stored in the first location of the hardware input/output register, retrieving the interrupt service routine from memory using an interrupt service routine address if stored in the first location of the hardware input/output register, and executing the interrupt service routine to adjust a setting to the adjusted feature setting level. Such aspects may further include executing an ancillary function in conjunction with executing the interrupt service routine.

Various aspects may further include a computing device, such as a mobile computing device, having a processor with a hardware input/output register in which the processor is configured to perform operations of any of the methods summarized above. Various aspects may further include a computing device, such as a mobile computing device, having means for performing functions of any of the methods summarized above. Various aspects may further include a non-transitory processor-readable medium on which are stored processor-executable instructions configured to cause a processor of a computing device, such as a mobile computing device, to perform operations of any of the methods summarized above.

BRIEF DESCRIPTION OF THE DRAWINGS

The accompanying drawings, which are incorporated herein and constitute part of this specification, illustrate example aspects of various aspects, and together with the general description given above and the detailed description given below, serve to explain the features of the claims.

DETAILED DESCRIPTION

Figure 1:
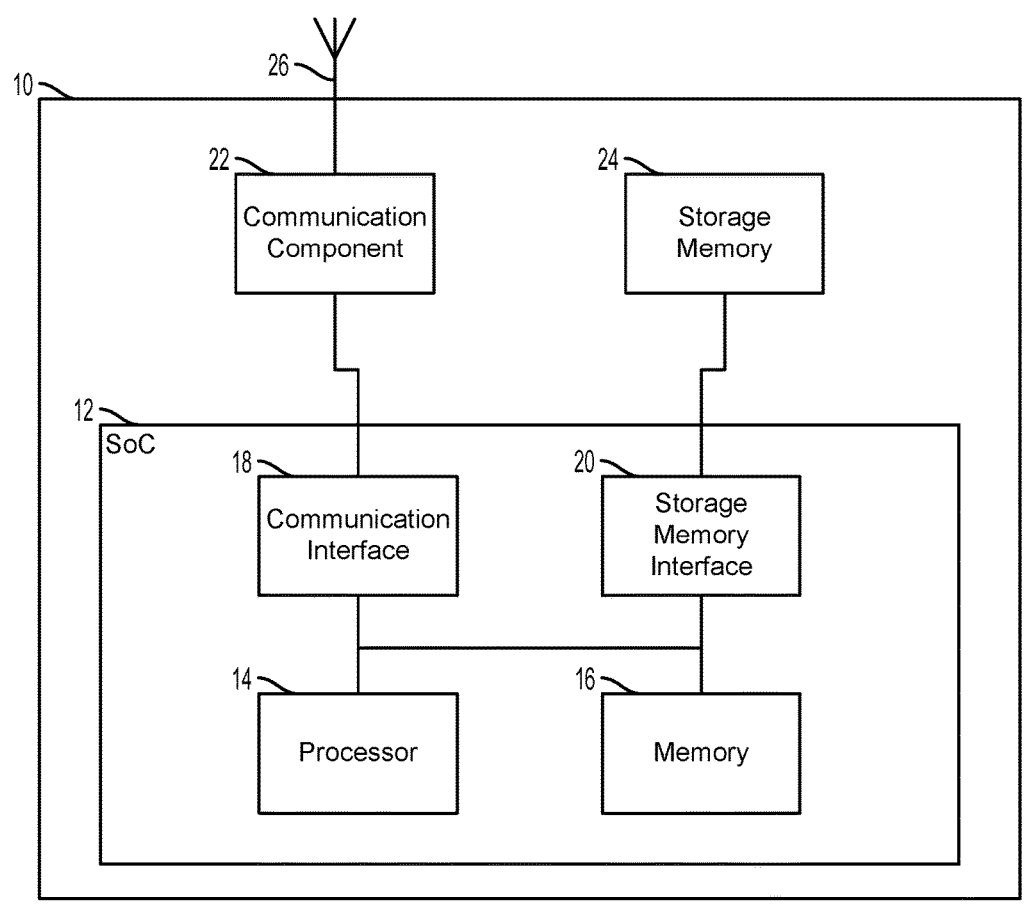
FIG. 1 is a component block diagram illustrating a computing device suitable for implementing various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects may include methods and computing devices implementing such methods for smart handling of input/output (I/O) interrupts for mobile computing device settings after reaching a limit. Various aspects may include modifying address registers for calling an interrupt service routine for changing a computing device setting when the setting is at the limit in order to reduce interrupts when further setting adjustments are not possible due to the limit. Various aspects may include modifying an address register for calling an interrupt service routine for changing the mobile computing device settings when the setting is at the limit to reinitiate interrupts for changing settings to levels within the limits. Limiting interrupts when settings are at a limit may conserve power in computing devices by enabling processors to remain in a low-power state in situations in which activating a processor to process an interrupt service routine would result in no change in settings.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles. Various aspects are applicable to any computing device including a hardware input/output interface, but may be of particular usefulness in mobile computing devices in which power conservation is a key design consideration due to the power storage limitations of batteries. Therefore, various aspects are described with reference to mobile computing devices. However, such references are not intended to be limiting.

A mobile computing device may have a hardware input/output interface (such as a button or a touch screen) that a user may touch or press to implement an associated function of the mobile computing device (referred to herein as a "hardware function"). A hardware function may be designated or assignable to a hardware input/output interface. A hardware function may include changing a setting level of a feature of the mobile computing device, such as a volume level, a vibration level, a brightness level, etc. In addition to implementing the hardware function associated with an actuated hardware input/output interface, a hardware function may include and/or trigger an ancillary function, typically configured to indicate to the user that the hardware function is implemented. An ancillary function may include a visual indicator via activation of a display or notification light (e.g., a light emitting diode), an audible indicator via activation of a speaker, and/or a haptic indicator via activation of a vibration motor.

To implement a hardware function and an associated ancillary function, an actuated hardware input/output interface may generate and transmit a hardware input/output interrupt signal to a dedicated hardware input/output processor (e.g., a dedicated processor or a processor executing a hardware input/output software routine) or a hardware input/output circuit. In response to receiving the hardware input/output interrupt signal, the processor or circuit may retrieve an address from a hardware input/output register for an interrupt service routine associated with actuating the hardware input/output interface. The interrupt service routine address may be used by a processor to retrieve and execute the interrupt service routine, which may generate an interrupt (hereinafter "hardware function interrupt") to send to a processor to signal for implementation of the hardware function.

Generating and processing the interrupts and implementing the functions requires resources of the mobile computing device, such as processor cycles and power. In situations in which the processor is in a low power state, the processing of such interrupts and executing the interrupt service routine involves transitioning the processor to an active or high-power state to complete routine, thus increasing power consumption. Thus, generating and processing a hardware function interrupt and implementing an ancillary function may occur regardless of whether the hardware function affects implementation of a mobile computing device feature. Execution of the interrupt service routine and hardware function in response to actuation of hardware input/output interface may not change a mobile computing device setting or feature if that setting or feature is already at a maximum or minimum setting level. The actions of generating and processing the interrupts and implementing the functions that result in no effect to the implementation of a mobile computing device feature may be considered a waste of the resources of the mobile computing device.

An interrupt service routine may be configured to determine a current feature setting level of a mobile computing device feature. The current feature setting level may be set in response to a previous actuation of the hardware input/output interface, a previous actuation of another hardware input/output interface, or a state of the mobile computing device. In various aspects, the interrupt service routine may be configured to compare the current feature setting level to a feature setting level limit to determine whether the current feature setting level is at the feature setting level limit. This comparison may be performed after or during an adjustment to the feature setting level, or periodically such as part of an overhead routine. In response to determining that the current feature setting level is at the level limit (e.g., upon adjusting the feature setting level to the limit), the interrupt service routine may set the hardware input/output register normally storing the address of the interrupt service routine to a value that prevents execution of the interrupt service routine, such as a null value or an address to a no operation (NoOP) instruction. With the input/output register normally storing a null value or NoOP instruction, the next press of the same hardware input will not result in the interrupt service routine being called. In response to determining that the current feature setting level is not at the level limit, the address of the interrupt service routine may be stored in the hardware input/output register so that the interrupt service routine functions in a conventional manner, responding to a hardware input by generating and sending a hardware input/output interrupt that causes a hardware function to adjust the feature setting level of the mobile computing device to an adjusted feature setting level. For example, in a mobile computing device implementing various aspects, a user pressing a volume up button may result in increasing the volume on the mobile computing device until the volume reaches the maximum level or limit, after which further presses of the volume up button do not trigger the interrupt service routine for increasing volume, resulting in no change in volume and no activation of an ancillary function, such as turning on the display. If a volume down button is then pressed, the volume down interrupt service routine will reduce the volume setting level below the maximum, and may restore the address of the up-volume interrupt service routine in the up-volume input register so that volume will be increased the next time the up-volume button is pressed.

FIG. 1 illustrates a system including a computing device 10 suitable for use with the various aspects. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example any number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a subsystem processor of specific components of the computing device, such as an image processor for a camera subsystem or a display processor for a display, an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

Some or all of the components of the computing device 10 may be arranged differently and/or combined while still serving the functions of the various aspects. The computing device 10 may not be limited to one of each of the components, and multiple instances of each component may be included in various configurations of the computing device 10.

Figure 2:
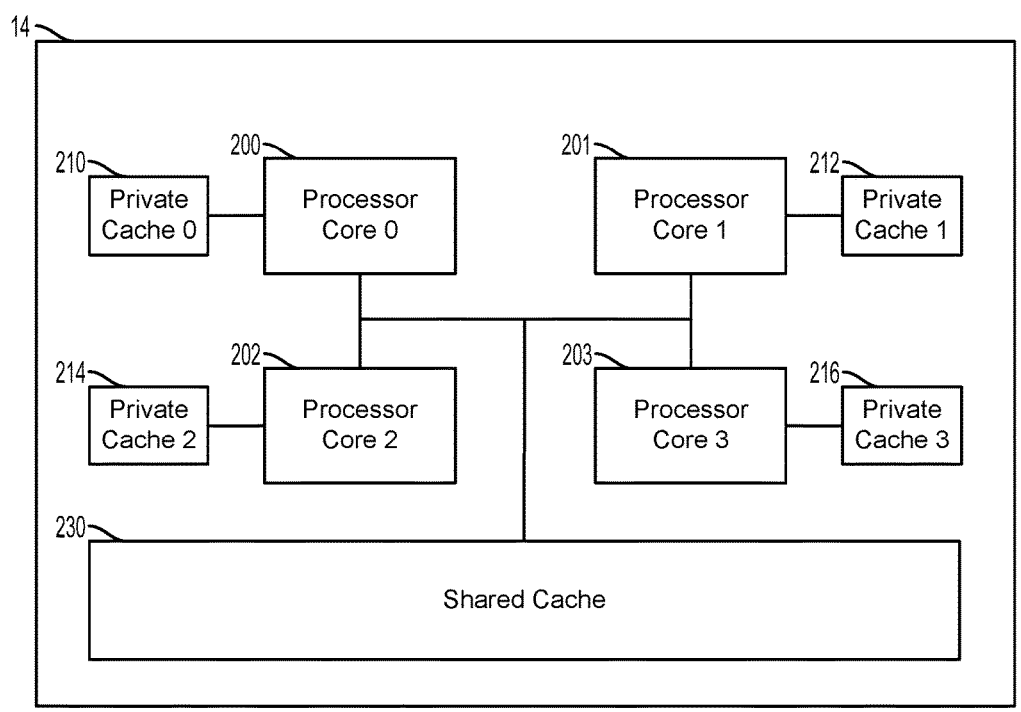
FIG. 2 is a component block diagram illustrating an example multicore processor suitable for implementing various aspects.

FIG. 2 illustrates a multicore processor suitable for implementing some aspects. The multicore processor 14 may include multiple processor types, including, for example, a CPU and various hardware accelerators, including for example, a GPU, a DSP, an APU, a subsystem processor, etc. The multicore processor 14 may also include a custom hardware accelerator, which may include custom processing hardware and/or general purpose hardware configured to implement a specialized set of functions.

The multicore processor may have a plurality of homogeneous or heterogeneous processor cores 200, 201, 202, 203. A homogeneous multicore processor may include a plurality of homogeneous processor cores. The processor cores 200, 201, 202, 203 may be homogeneous in that, the processor cores 200, 201, 202, 203 of the multicore processor 14 may be configured for the same purpose and have the same or similar performance characteristics. For example, the multicore processor 14 may be a general purpose processor, and the processor cores 200, 201, 202, 203 may be homogeneous general purpose processor cores. The multicore processor 14 may be a GPU or a DSP, and the processor cores 200, 201, 202, 203 may be homogeneous graphics processor cores or digital signal processor cores, respectively. The multicore processor 14 may be a custom hardware accelerator with homogeneous processor cores 200, 201, 202, 203.

A heterogeneous multicore processor may include a plurality of heterogeneous processor cores. The processor cores 200, 201, 202, 203 may be heterogeneous in that the processor cores 200, 201, 202, 203 of the multicore processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar aspects, an SoC (for example, SoC 12 of FIG. 1) may include any number of homogeneous or heterogeneous multicore processors 14. In various aspects, not all off the processor cores 200, 201, 202, 203 need to be heterogeneous processor cores, as a heterogeneous multicore processor may include any combination of processor cores 200, 201, 202, 203 including at least one heterogeneous processor core.

Each of the processor cores 200, 201, 202, 203 of a multicore processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The multicore processor 14 may further include a shared cache 230 that may be configured to read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the multicore processor 14. The shared cache 230 may include volatile memory as described herein with reference to memory 16 of FIG. 1.

In the example illustrated in FIG. 2, the multicore processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various aspects to a four-core processor system with four designated private caches. The computing device 10, the SoC 12, or the multicore processor 14 may individually or in combination include fewer or more than the four processor cores 200, 201, 202, 203 and private caches 210, 212, 214, 216 illustrated and described herein. For ease of reference, the terms "hardware accelerator," "custom hardware accelerator," "multicore processor," "processor," and "processor core" may be used interchangeably herein.

Figure 3:
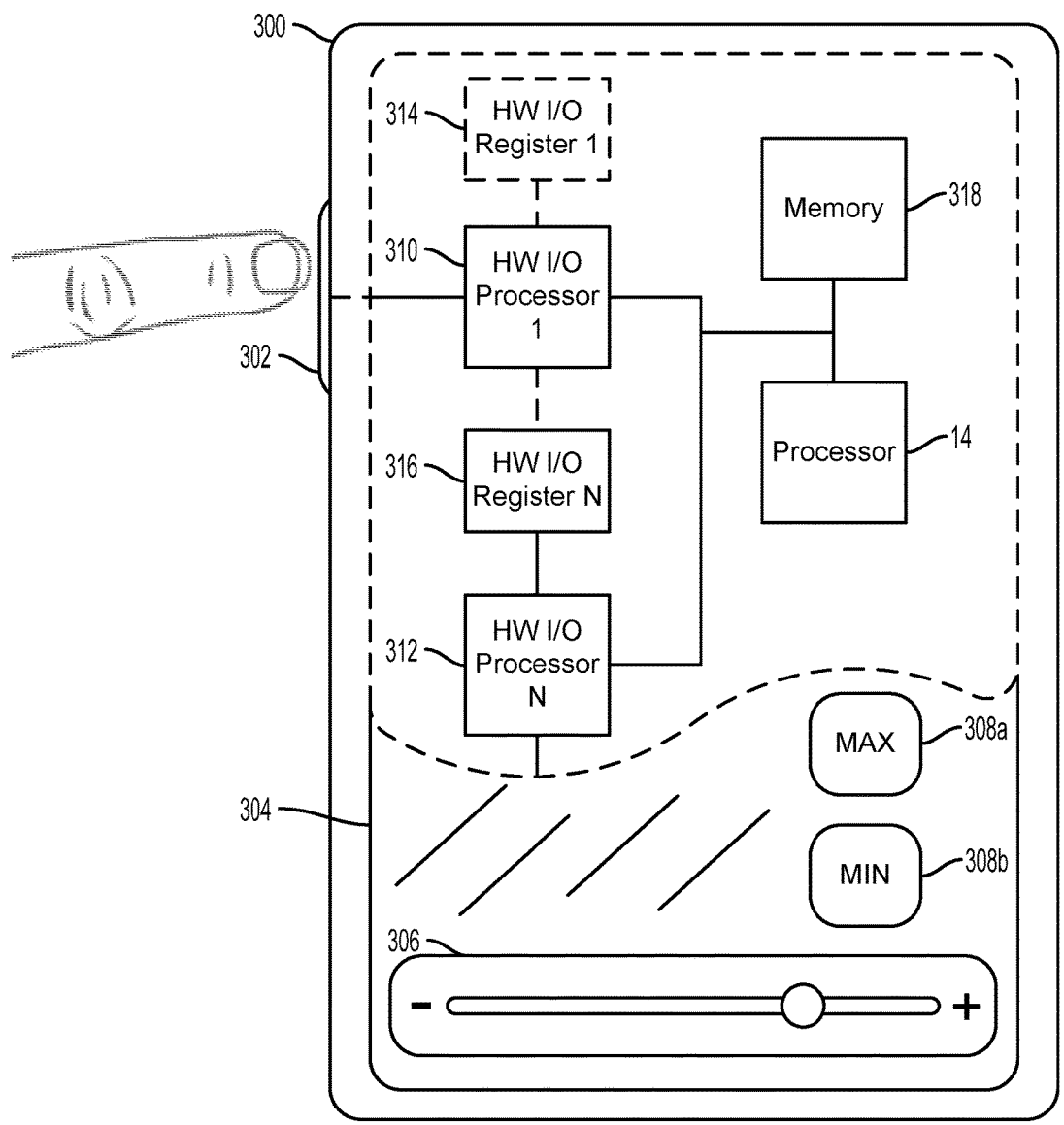
FIG. 3 is a block diagram illustrating an example mobile computing device suitable for implementing various aspects.

FIG. 3 illustrates a mobile computing device suitable for implementing some aspects. With reference to FIGS. 1-3, the mobile computing device 300 (e.g., computing device 10 in FIG. 1) may include a variety of components as described above. Some such components and additional components may be employed to implement smart handling of input/output interrupts. In various aspects, the mobile computing device may include a hardware input/output interface 302, 304, a hardware input/output processor 310, 312, a hardware input/output register 314, 316, a processor 14, and a memory 318. In various aspects, the hardware input/output processor 310, 312 may be a hardware input/output circuit or a processor (e.g., processor 14 in FIGS. 1 and 2) configured with hardware input/output software. For the sake of brevity and ease of explanation, various aspects may be described with reference to the hardware input/output processor 310, 312. However, such descriptions are for illustrative purposes and are not intended to limit the scope of the claims.

A hardware input/output interface 302, 304 may be a component of a mobile computing device 300 with which a user may interact. The hardware input/output interface 302, 304 may include a button 302, a touch screen 304, a device connector (not shown), an audio sensor (e.g., a microphone), a gesture sensor (e.g., a light sensor) (not shown), a motion sensor (e.g., accelerometer or gyroscope) (not shown), a wireless signal receiver (e.g., an antenna 26 in FIG. 1). User interaction may include pressing the hardware input/output interface 302, 304, touching the hardware input/output interface 302, 304, connecting a peripheral device wired and/or wireless connector to the hardware input/output interface 302, 304, making a voice command to the hardware input/output interface 302, 304, gesturing in front of the hardware input/output interface 302, 304, and/or moving the hardware input/output interface 302, 304 by moving the mobile computing device 300.

The hardware input/output interface 302, 304 may be configured to generate a hardware input/output interrupt signal in response to the user interaction with the hardware input/output interface 302, 304. For example, a physical user interaction with the hardware input/output interface 302, 304 may cause a circuit to generate an electrical signal as the hardware input/output interrupt signal. As another example, physical user interaction with the hardware input/output interface 302, 304 may cause a bit in a status register to be set or reset. The hardware input/output interface 302, 304 may be configured to generate a hardware input/output interrupt signal having various qualities that may indicate qualities of the user interaction. Such qualities of the hardware input/output interrupt signal may include qualities of an electrical signal and or data relating to the qualities of the user interaction, including current, voltage, duration, pressure, location, direction, speed, frequency, touch patterns, voice commands, gestures, movements of the mobile computing device 300, connections of peripheral devices, etc. The hardware input/output interface 302, 304 may be electrically connected to a hardware input/output processor 310, 312, and may be configured to transmit the hardware input/output interrupt signal to the hardware input/output processor 310, 312.

The hardware input/output processor 310, 312 (e.g., HW I/O processor 1 310, and HW I/O processor N 312) (e.g., the processor 14 in FIGS. 1 and 2), may be configured to receive a hardware input/output interrupt signal from any number of hardware input/output interfaces 302, 304, including being dedicated to receive a hardware input/output interrupt signal from a single hardware input/output interface 302, 304. The hardware input/output processor 310, 312 may be configured to control and respond to inputs from and outputs to the hardware input/output interface 302, 304, including responding to the hardware input/output interrupt signal.

In various aspects, a hardware input/output processor 310, 312 may be configured to interpret and respond to any number and/or quality of hardware input/output interrupt signals. The hardware input/output processor 310, 312 may interpret a hardware input/output interrupt signal to correspond to an interrupt service routine that implements an associated hardware function and respond to the hardware input/output interrupt signal based on the corresponding interrupt service routine. A hardware function may include increasing and/or decreasing a feature setting level, and/or setting a feature setting level to a designated level. Examples of feature setting levels may include a volume level, a vibration level, a brightness level, a camera zoom setting, etc.

In various aspects, different hardware input/output interrupt signals and qualities of hardware input/output interrupt signals may correspond to different interrupt service routines for different hardware functions. For example, pressing a button 302 for no longer than a first duration may correspond to a first interrupt service routine for a first designated increase in a feature setting level, but pressing the button 302 for longer than first duration (e.g., for at least a second duration longer than the first duration) may correspond to a second interrupt service routine for a second designated increase in the feature setting level greater than the first designated increase.

In various aspects, different combinations of hardware input/output interrupt signals and qualities of hardware input/output interrupt signals may correspond to different interrupt service routines for different hardware functions. In other words, different hardware input/output interrupt signals and qualities of hardware input/output interrupt signals combinations (e.g., current, voltage, duration, pressure, location, direction, speed, frequency, touch patterns, voice commands, gestures, movements of the mobile computing device 300, connections of peripheral devices, etc.) may correspond to different interrupt service routines for different hardware functions. For example, a single press of a button 302 during a designated period may correspond to the first interrupt service routine for the first designated increase, and multiple presses of the button 302 during the designated period may correspond to the second interrupt service routine for the second designated increase. As a further example, connecting a peripheral audio device (e.g., wired and/or wireless headphones) to the mobile device 300 via the hardware input/output interface 302, 304 may generate input/output interrupt signals with qualities that may identify the peripheral audio device. The input/output interrupt signals with such qualities may correspond to an interrupt service routine for setting the feature setting level to a designated level.

The hardware input/output processor 310, 312 may be configured to retrieve an address for an interrupt service routine corresponding to the hardware function associated with hardware input/output interrupt signal or combination of hardware input/output interrupt signals. The hardware input/output processor 310, 312 may be coupled to a hardware input/output register 314, 316 from which the address for the interrupt service routine may be retrieved. The interrupt service routine address may be for a location in the memory 318 and/or for a location in a local memory (e.g., the private cache 210, 212, 214, 216, the shared cache 230 in FIG. 2) of the hardware input/output processor 310, 312.

In various aspects, the hardware input/output processor 310, 312 may be programmed to correlate a specific hardware input/output interrupt signal or combination of hardware input/output interrupt signals with an interrupt service routine for a hardware function. From a user perspective, the programming may correlate a hardware input/output interface 302, 304 with a hardware function for a mobile computing device feature. For example, an area of a touch screen 304 may be configured to display a variable adjuster 306 (e.g., a slider, a track bar, a dial, etc.) and/or soft buttons 308a, 308b. The touch screen 304 may be configured to generate the hardware input/output interrupt signal including the area of the touch screen 304 at which the user interaction occurred. In response to the hardware input/output interrupt signal, the hardware input/output processor 310, 312 may interpret that the hardware input/output interrupt signal indicates that the user interaction occurred at the area of the touch screen 304 corresponding to a displayed item. The hardware input/output processor 310, 312 may be programmed to correlate the hardware input/output interrupt signal indicating that the user interaction occurred at the area of the touch screen 304 corresponding to a displayed item with a specific interrupt service routine for a hardware function. Based on the programming, the hardware input/output processor 310, 312 may respond to the hardware input/output interrupt signal by retrieving and implementing the interrupt service routine associated with the area of the touch screen 304 corresponding to the displayed item.

For example, a user interaction moving a current position of the variable adjuster 306 to the right or touching a soft button 308a may result in a hardware input/output interrupt signal correspond to an interrupt service routine for implementing a hardware function for increasing a mobile computing device feature (e.g., volume) setting level. A user interaction moving a current position of the variable adjuster 306 to the left or touching soft button 308b may result in a hardware input/output interrupt signal correspond with an interrupt service routine for implementing a hardware function for reducing the feature setting level. The hardware input/output processor 310, 312 may be configured to retrieve an address for the interrupt service routine corresponding to the hardware input/output interrupt signal indicated in the area of the touch screen 304 corresponding to the displayed item.

The hardware input/output register 314, 316 (e.g., an HW I/O register 1 314 and/or an HW I/O register N 316) (e.g., the private cache 210, 212, 214, 216, the shared cache 230 in FIG. 2) may be configured to store any number of addresses for any number of interrupt service routines, including complement interrupt service routines. A complement interrupt service routine may be an interrupt service routine for prompting a hardware function configured to change a feature setting in a manner that is the opposite of another interrupt service routine associated with the same feature setting level. For example, an up-volume interrupt service routine may have an associated complement down-volume interrupt service routine (i.e., the up-volume interrupt service routine adjusts the volume setting level up and the down-volume interrupt service routine adjusts the volume down). In various aspects, a hardware input/output register 314, 316 storing an address for an interrupt service routine may store an address for a complement interrupt service routine. For brevity and ease of explanation, the descriptions of an interrupt service routine may also apply to a complement interrupt service routine in a similar (though perhaps opposite) manner.

A designated location of the hardware input/output register 314, 316 may correspond to a specific interrupt service routine. The hardware input/output register 314, 316 may be electrically connected to any number of hardware input/output processors 310, 312. For example, the hardware input/output register 314 may be electrically connected to a single hardware input/output processor 310. The hardware input/output register 314 may be configured to store addresses for the interrupt service routines corresponding to the hardware functions and/or the associated hardware input/output interrupt signals or combination of hardware input/output interrupt signals received by the hardware input/output processor 310. The hardware input/output register 316 may be electrically connected to multiple hardware input/output processors 310, 312. The hardware input/output register 316 may be configured to store addresses for the interrupt service routines corresponding to the hardware functions and/or the associated hardware input/output interrupt signals or combination of hardware input/output interrupt signals received by the hardware input/output processors 310, 312.

In various aspects, the hardware input/output register 314, 316 may be programmable, and the hardware input/output processor 310, 312 may be configured to change the stored addresses for the interrupt service routines in the hardware input/output register 314, 316. The hardware input/output processor 310, 312 may change a stored address for an interrupt service routine to a Null value and/or to an address corresponding to a no operation instruction. Replacing the stored address for the interrupt service routine with the Null value and/or to the address corresponding to a no operation instruction may prevent execution of the interrupt service routine. The hardware input/output processor 310, 312 may also reload the address for the interrupt service routine in the hardware input/output register 314, 316 when the feature setting is changed such that the setting is no longer equal to the limit. Reloading the address for the interrupt service routine into the hardware input/output register 314, 316 enables execution of the interrupt service routine the next time the hardware input is touched or otherwise activated by a user.

In various aspects, the hardware input/output processor 310, 312 may track a current feature setting level. The current feature setting level may be set in response to a previous actuation of the hardware input/output interface, a previous actuation of another hardware input/output interface, or a state of the mobile computing device. For example, a current feature setting level for volume may be set by a previous actuation of a volume up or down button, or by connection of headphones resulting in setting the volume to a designated level, such as a volume determined to be safe for listening. In another example, a current feature setting level for screen brightness may be set in response to a low power state of the mobile computing device 300 resulting in setting the screen brightness to a designated level, such as a brightness determined to reduce power draw from a battery of the mobile computing device 300. In various aspects, the hardware input/output processor 310, 312 may also track an adjusted feature setting level. The adjusted feature setting level may be the current feature setting level updated in response to an actuation of the hardware input/output interface, an actuation of another hardware input/output interface, or a state of the mobile computing device.

In various aspects, the hardware input/output processor 310, 312 may compare the current feature setting level and a feature setting level limit or threshold, which may be a feature maximum or minimum for the mobile computing device feature. The outcome of the comparison of the current feature setting level and the feature setting level limit or threshold may affect the implementation of smart handling of hardware input/output interrupts as described further herein.

In various aspects, the hardware input/output processor 310, 312 may compare the adjusted feature setting level and a feature setting level limit or threshold. The hardware input/output processor 310, 312 may be configured to change the stored address for an interrupt service routine to a Null value and/or to an address corresponding to a no operation instruction in response to the adjusted feature setting level equaling a feature setting level limit or threshold.

In various aspects, the hardware input/output processor 310, 312 may compare the current feature setting level and to a complement feature setting level limit or threshold, which may be a feature setting level that is on an opposite end of a permissible range of the feature setting level from the first feature setting level limit at or beyond which the feature setting level has no effect on the mobile computing device feature. In various aspects, the feature setting level limit or threshold and the complement feature setting level limit or threshold may be at opposite ends of a permissible range of feature setting levels and beyond which further hardware inputs will not affect the mobile computing device feature setting level. The hardware input/output processor 310, 312 may be configured to change a Null value and/or an address corresponding to a no operation instruction to the address for the complement interrupt service routine in response to the current feature setting level not equaling a complement feature setting level limit or threshold.

In the various aspects described herein, various implementations of comparisons between a current feature setting level and a feature setting level limit or threshold, between an adjusted feature setting level and a feature setting level limit or threshold are considered, and between a current feature setting level and a complement feature setting level limit or threshold. Such, implementations may include comparisons for which the current and/or adjusted feature setting levels equal the feature setting level limit or threshold and/or the complement feature setting level limit or threshold. For the sake of brevity and ease of explanation, the terms "limit" and "threshold" are also used interchangeably herein.

The hardware input/output processor 310, 312 may be further configured to retrieve the interrupt service routine from the location in the memory 318 and/or the location in the local memory of the hardware input/output processor 310, 312 specified by the retrieved address for an interrupt service routine. The hardware input/output processor 310, 312 may be electrically connected to the memory 318 and/or the location in the local memory, and may access the memory 318 and/or the location in the local memory to retrieve the interrupt service routine.

The hardware input/output processor 310, 312 may execute the retrieved interrupt service routine and generate a hardware function interrupt configured to prompt the processor 14 to implement the hardware function corresponding to the interrupt service routine. In various aspects, the interrupt service routine may correspond to the hardware function and to ancillary functions that may be executed by the processor 14 in connection with executing the hardware functions. In various aspects, an ancillary function may include a visual indicator via activation of a display or notification light (e.g., a light emitting diode), an audible indicator via activation of a speaker, and/or a haptic indicator via activation of a vibration motor. The hardware input/output processor 310, 312 may be electrically connected to the processor 14, and may transmit the hardware function interrupt to the processor 14.

The processor 14 may be configured to receive the hardware function interrupt, and, in response to the hardware function interrupt, pause execution of a current process being executed by the processor 14 to implement the hardware function correlated with the hardware function interrupt. In various aspects, like the hardware input/output processor 310, 312 and the hardware input/output interrupts, the processor 14 may be configured to interpret the hardware function interrupt to determine which hardware function is correlated with the hardware function interrupt and/or from where to retrieve the hardware function. In various aspects, the processor 14 may also be configured to interpret the hardware function interrupt to determine which ancillary functions are correlated with the hardware function interrupt and/or from where to retrieve the ancillary functions. In various aspects, the ancillary functions may be included in code for the hardware function and/or triggered by code for the hardware function. The processor 14 may be electrically connected to the memory 318 and/or a local memory (e.g., the private cache 210, 212, 214, 216, the shared cache 230 in FIG. 2) of the processor 14. The processor 14 may be configured to retrieve the hardware function and/or ancillary functions from the memory 318 and/or local memory, and execute the hardware function and/or ancillary functions.

The memory 318 (e.g., the memory 16, 24 in FIG. 1, the private cache 210, 212, 214, 216, the shared cache 230 in FIG. 2) may be configured to store code and/or data for the interrupt service routines, hardware functions, ancillary functions, and/or the no operation instruction. The memory 318 may be electrically connected to the hardware input/output processor 310, 312 and/or the processor 14. The memory 318 may be configured to allow access to the code and/or data for the interrupt service routines, hardware functions, ancillary functions, and/or the no operation instruction by the hardware input/output processor 310, 312 and/or the processor 14.

FIG. 3 illustrates non-limiting examples of a mobile computing device 300. The examples illustrated and described herein, particularly with reference to those of and relating to FIG. 3, are non-limiting. The mobile computing device may include any number and/or combination of hardware input/output interfaces, hardware input/output processors, hardware input/output registers, processors, memories, and other components described herein with reference to FIGS. 1 and 2, and connections between such components. In various aspects, any combination of the components of a mobile computing device may be combined or separated and included as part of or distributed over multiple SoCs (e.g., SoC 12 in FIG. 1) which may be communicatively connected via an interconnect (not shown).

The various aspects described herein with reference to FIGS. 4-10 are described using example hardware components particularly with reference to those of and relating to FIGS. 1-3. These combinations of hardware components are in no way limiting to the number or type hardware input/output interfaces, hardware input/output processors, hardware input/output registers, processors, memories, other components described herein with reference to FIGS. 1 and 2 that may be included as hardware components for implementing the various aspects described herein.

Figure 4A:
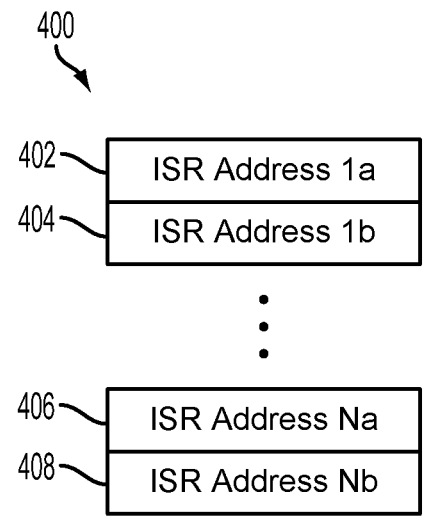
FIGS. 4A and 4B are block diagrams illustrating hardware input/output registers suitable for implementing various aspects.
Figure 4B:
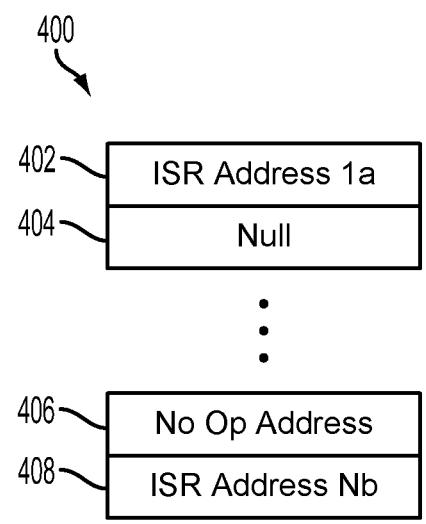

FIGS. 4A and 4B illustrate an example of a hardware input/output register 400 (e.g., hardware input/output register 314, 316 in FIG. 3) according to some aspects. The hardware input/output register 400 may be configured with multiple register locations 402, 404, 406, 408 configured to store data. In various aspects, the data may include addresses in a memory (e.g., the memory 16, 24 in FIG. 1, the private cache 210, 212, 214, 216, the shared cache 230 in FIG. 2, the memory 318 in FIG. 3) for interrupt services routines and complement interrupt service routines. For example, an interrupt service routine (ISR) address 1a is illustrated in register location 402 in FIGS. 4A and 4B, an interrupt service routine address 1b is illustrated in register location 404 in FIG. 4A, an interrupt service routine address Na is illustrated in register location 406 in FIG. 4A, and an interrupt service routine address Nb is illustrated in register location 408 in FIGS. 4A and 4B. In various aspects, the data may include a Null value (e.g., Null in in register location 404 in FIG. 4B) and/or an address in the memory for a no operation instruction (e.g., no operation (No Op) in register location 406 in FIG. 4B). A register location 402, 404, 406, 408 may correspond to a particular hardware input/output interrupt signals or combination of hardware input/output interrupt signals generated by actuation of a hardware input/output interface (e.g., the hardware input/output interface 302, 304 in FIG. 3) and received by a hardware input/output processors (e.g., the hardware input/output processor 310, 312 in FIG. 3). In various aspects, the hardware input/output register 400 may include any number of register locations 402, 404, 406, 408. In various aspects, the hardware input/output register 400 may include register locations 402, 404, 406, 408 for at least one interrupt service routine and its complement interrupt service routine. In various aspects, the register locations 402, 404, 406, 408 of a hardware input/output register 400 may be accessible by any number of hardware input/output processors.

In response to receiving one or a combination of hardware input/output interrupt signals, a hardware input/output processors may determine from the hardware input/output interrupt signal(s) a corresponding register location 402, 404, 406, 408 in the hardware input/output register 400. The processing device may access the corresponding register location 402, 404, 406, 408 and retrieve the data stored at the corresponding register location 402, 404, 406, 408. In various aspects, the corresponding register location 402, 404, 406, 408 may store an address to an interrupt service routine corresponding to the actuation of the hardware input/output interface and the hardware input/output interrupt signal(s). The hardware input/output processors may use the address to the interrupt service routine to retrieve and implement the interrupt service routine. When adjusted according to various aspects, the corresponding register location 402, 404, 406, 408 may store a Null value. The hardware input/output processors may handle the Null value by moving to a next instruction. When adjusted according to various aspects, the corresponding register location 402, 404, 406, 408 may store an address to a no operation instruction. The hardware input/output processors may use the address to the operation instruction to retrieve and implement the operation instruction. Storing a Null value and/or an address to a no operation instruction at a register location 402, 404, 406, 408 may prevent implementation of an interrupt service routine corresponding to the register location 402, 404, 406, 408.

Whether a register location 402, 404, 406, 408 stores an address to a corresponding interrupt service routine, a Null value, and/or an address to a no operation instruction may depend on a current feature setting level and/or an adjusted feature setting level of a feature setting for the mobile computing device feature associated with a hardware function, which is associated with the interrupt service routine corresponding to the register location 402, 404, 406, 408. A hardware input/output processor may track and compare current and/or adjusted feature setting levels with a feature setting level limit and/or a complement feature setting level limit. As described, based on the comparisons, the hardware input/output processor may change the address of an interrupt service routine stored in the register location 402, 404, 406, 408 to a Null value and/or to an address to a no operation instruction when the current or adjusted feature setting level equals the feature setting level threshold. For example, the data stored in the register locations 404, 406, shown in FIG. 4A as storing interrupt service routine addresses 1b and Na, may be changed so that the register location 404 stores a Null value and/or the register location 406 stores an address to a no operation instruction, as shown in FIG. 4B. Similarly, based on the comparisons, the hardware input/output processor may change the Null value and/or the address to a no operation instruction to the address to the interrupt service routine. For example, the data stored in the register location 404, shown in FIG. 4b as storing a Null value and/or the register location 406 storing an address to a no operation instruction, may be changed so that the register locations 404, 406 store interrupt service routine addresses 1b and Na, as shown in FIG. 4A.

FIGS. 5A-5D illustrate examples of operations and data flows for smart handling of input/output interrupts for implementing some aspects. The examples illustrated in FIGS. 5A-5D relate to the structures of the components illustrated in FIGS. 1-4. The hardware input/output interface (HW I/O interface) 500, the hardware input/output processor (HW I/O processor) 502, hardware input/output register (HW I/O register) 504, the processor 14, and the memory device 318 are used as examples for ease of explanation and brevity, but are not meant to limit the claims to the illustrated number and/or types of hardware input/output interfaces (e.g., hardware input/output interface 302, 304 in FIG. 3), hardware input/output processors (e.g., processor 14 in FIGS. 1-3, hardware input/output processor 310, 312 in FIG. 3), hardware input/output registers (e.g., hardware input/output register 314, 316, 400 in FIGS. 3, 4A, and 4B), processors (e.g., processor 14 in FIGS. 1-3), or memories devices (e.g., memory 16, 24 in FIG. 1, dedicated cache memories 210, 212, 214, 216 and shared cache memories 212, 214 in FIG. 2, memory 318 in FIG. 3). Further, the order of the operations and signals 506-524 is used as an example for ease of explanation and brevity, but is not meant to limit the claims to a particular order of execution of the operations and exchange of signals 506-524 as several of the operations and signals 506-524 may be implemented in parallel or in different orders.

Figure 5A:
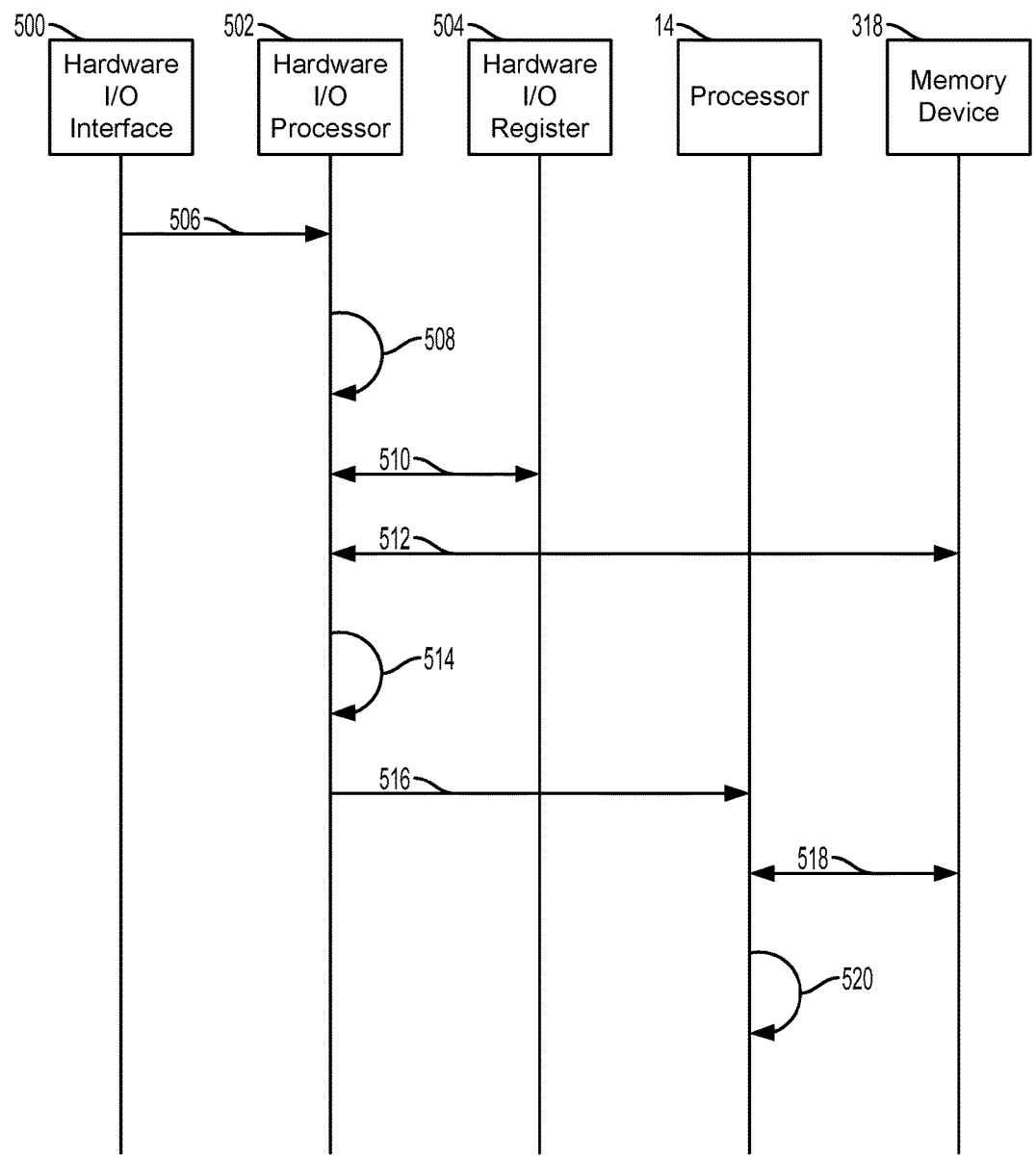
FIGS. 5A-5D are component interaction signaling diagrams illustrating examples of communication flows and operations for smart handling of input/output interrupts according to various aspects.

FIG. 5A illustrates an example of smart handling of input/output interrupts for current and adjusted feature setting levels between the feature setting level limit and the complement feature setting level limit according to some aspects. For example, FIG. 5A illustrates operations and signals that may be involved in response to a user adjusting the volume level of a mobile computing device between the minimum volume level and the maximum volume level.

A user may actuate the hardware input/output interface 500, and in response to the actuation, the hardware input/output interface 500 may generate and transmit 506 a hardware input/output interrupt signal to the hardware input/output processor 502. In various aspects, the hardware input/output interrupt signal may be configured to indicate actuation of the hardware input/output interface 500. In various aspects, the hardware input/output interrupt signal may not include any information identifying the hardware input/output interface 500, and the hardware input/output processor 502 may be configured to identify the hardware input/output interface 500 as the source of the hardware input/output interrupt signal. For example, the hardware input/output processor 502 may identify the source of the hardware input/output interrupt signal by receiving the hardware input/output interrupt signal at a pin associated with the hardware input/output interface 500. The hardware input/output processor 502 may also identify an interrupt service routine corresponding to the hardware input/output interrupt signal in a similar manner. In various aspects, the hardware input/output interrupt signal may include qualities and/or information that may be used by the hardware input/output processor 502 to identify the hardware input/output interface 500 as the source of the hardware input/output interrupt signal and/or to identify an interrupt service routine corresponding to the hardware input/output interrupt signal. As described herein, such qualities and/or information may include current, voltage, duration, pressure, location, direction, speed, frequency, touch patterns, voice commands, gestures, movements of the mobile computing device (e.g., mobile computing device 10, 300 in FIGS. 1 and 3), connections of peripheral devices, etc.

The hardware input/output processor 502 may analyze 508 the hardware input/output interrupt signal. In various aspects, analyzing 508 the hardware input/output interrupt signal may include interpreting the hardware input/output interrupt signal to identify the source hardware input/output interface 500, identify the interrupt service routine corresponding to the hardware input/output interrupt signal and the location in the hardware input/output register 504 corresponding to the interrupt service routine. Analyzing 508 the hardware input/output interrupt signal may include comparing the current feature setting level to the feature setting level limit and/or the complement feature setting level limit. Analyzing 508 the hardware input/output interrupt signal may include updating the current and/or adjusted feature setting levels to reflect the actuation of the hardware input/output interface 500 and/or implementation of a hardware function. In various aspects, the hardware input/output processor 502 may track and update the adjusted and/or current feature setting levels on its own or without using and/or waiting for an actual mobile device setting level tracked and/or set by the processor 14. In various aspects, the current feature setting level may be modified to provide the adjusted feature setting level, and the adjusted feature setting level may be used to update the current feature setting level. Analyzing 508 the hardware input/output interrupt signal may include comparing the adjusted feature setting level to the feature setting level limit.

When the comparison of the current feature setting level to the complement feature setting level limit indicates that the current feature setting level is not at the complement feature setting level limit, no changes may be made to the data stored at the location in the hardware input/output register 504 associated with a complement interrupt service routine.

When the comparison of the current feature setting level to the feature setting level limit indicates that the current feature setting level does not equal the feature setting level limit, the hardware input/output processor 502 to retrieve 510 data stored at a location in the hardware input/output register 504 associated with an interrupt service routine. In various aspects, the hardware input/output processor 502 may retrieve 512 the address for the interrupt service routine, a Null value, and/or an address for a no operation instruction.

In the example illustrated in FIG. 5A, the hardware input/output processor 502 may retrieve 510 the address for the interrupt service routine, and may use the address for the interrupt service routine to retrieve 512 the interrupt service routine (i.e., code and/or data for executing the interrupt service routine) from the memory 318. The hardware input/output processor 502 may execute 514 the interrupt service routine, generating a hardware function interrupt configured to prompt the processor 14 to implement the hardware function associated with the interrupt service routine. The hardware input/output processor 502 may transmit 516 the hardware function interrupt to the processor 14.

In response to receiving the hardware function interrupt, the processor 14 may interrupt or pause any process currently executing on the processor 14 and retrieve 518 a hardware function (i.e., code and/or data for executing the hardware function) associated with the interrupt service routine from the memory 318. The processor 14 may execute 520 the retrieved hardware function. In various aspects, the processor 14 may also retrieve an ancillary function (i.e., code and/or data for executing the ancillary function) associated with the interrupt service routine or with the hardware function, from the memory 318. The processor 14 may execute the retrieved ancillary function. Executing 520 the hardware function may result in changing a feature setting level so the mobile device feature is implemented differently than before the change to the mobile device feature setting level. In various aspects, the actual mobile device setting level may be used to update the adjusted and/or current feature setting levels.

Figure 5B:
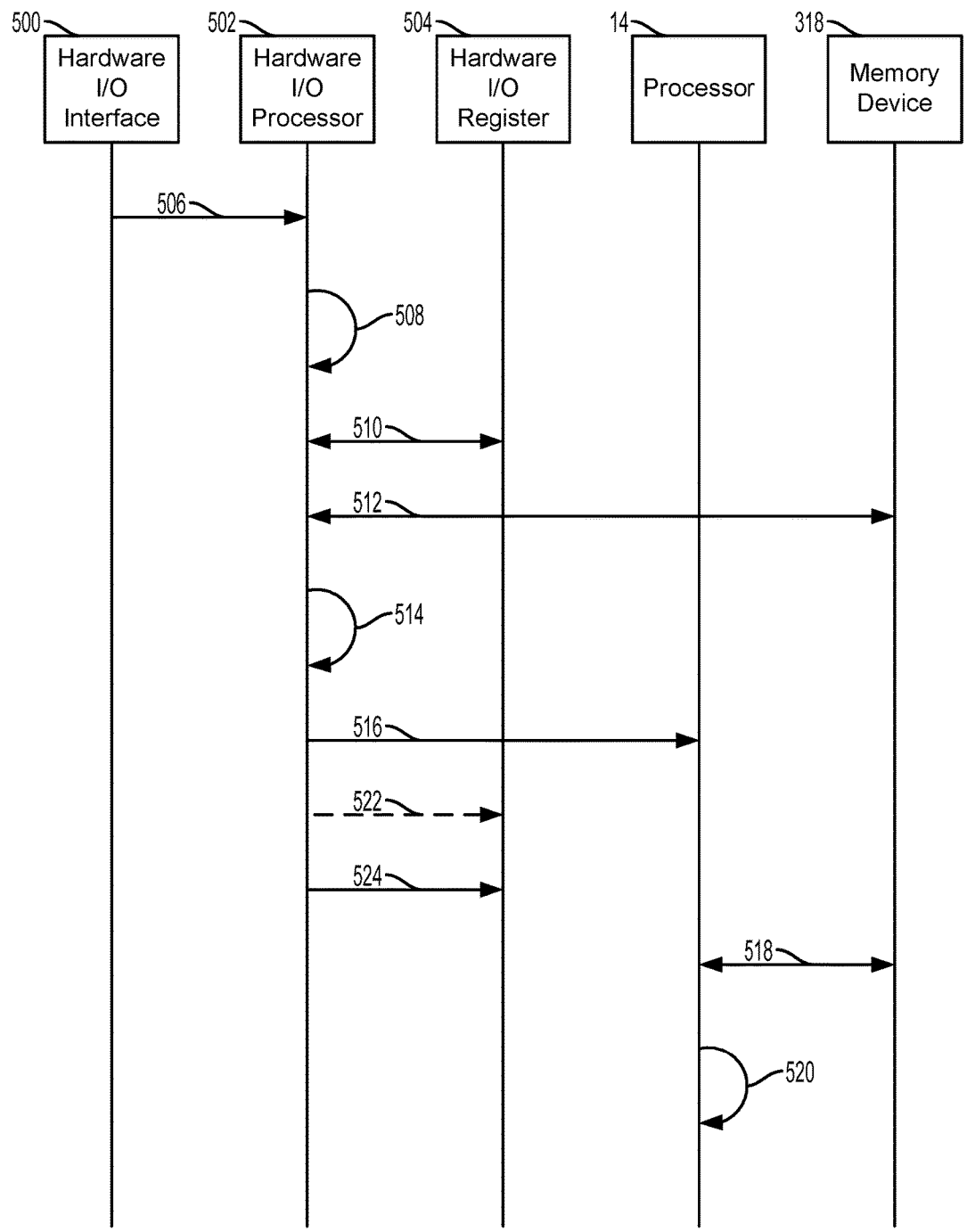

The example illustrated in FIG. 5B represents smart handling of input/output interrupts for a current feature setting level not equaling and an adjusted feature setting level equaling the feature setting level limit. For example, FIG. 5A illustrates operations and signals that may be involved in response to a user adjusting the volume level of a mobile computing device to a maximum volume. In various aspects, the operations and signal 506-520 may be implemented in a similar manner as described herein with reference to the operations and signal 506-520 in FIG. 5A.

A user may actuate the hardware input/output interface 500, and in response to the actuation, the hardware input/output interface 500 may generate and transmit 506 a hardware input/output interrupt signal to the hardware input/output processor 502. The hardware input/output processor 502 may analyze 508 the hardware input/output interrupt signal.

In some aspects, when the comparison of the current feature setting level to the feature setting level limit indicates that the current feature setting level does not equal the feature setting level limit, the hardware input/output processor 502 may retrieve 510 data stored at a location in the hardware input/output register 504 associated with an interrupt service routine.

The hardware input/output processor 502 may retrieve 510 the address for the interrupt service routine, and may use the address for the interrupt service routine to retrieve 512 the interrupt service routine (i.e., code and/or data for executing the interrupt service routine) from the memory 318. The hardware input/output processor 502 may execute 514 the interrupt service routine, generating a hardware function interrupt configured to prompt the processor 14 to implement the hardware function associated with the interrupt service routine. The hardware input/output processor 502 may transmit 516 the hardware function interrupt to the processor 14.

When a comparison of the current feature setting level to the complement feature setting level limit indicates that the current feature setting level does not equal the complement feature setting level limit, no changes may be made to data stored at a location in the hardware input/output register 504 associated with a complement interrupt service routine. When a comparison of the current feature setting level to the complement feature setting level limit indicates that the current feature setting level equals the complement feature setting level limit, the hardware input/output processor 502 may modify 522 the data stored at the location in the hardware input/output register 504 associated with the complement interrupt service routine. In various aspects, modifying 522 the data stored at the location in the hardware input/output register 504 may include changing a Null value and/or an address for a no operation instruction to an address for a complement interrupt service routine.

In the example illustrated in FIG. 5B, the comparison of the adjusted feature setting level to the feature setting level limit indicates that the adjusted feature setting level equals the feature setting level limit. In this situation, the hardware input/output processor 502 may modify 524 the address for the interrupt service routine stored at the location in the hardware input/output register 504 associated with the interrupt service routine. In various aspects, modifying 524 the address for the interrupt service routine stored at the location in the hardware input/output register 504 may include changing the address for the interrupt service routine to a Null value and/or to an address for a no operation instruction.

In response to receiving the hardware function interrupt, the processor 14 may interrupt or pause any process currently being executed by the processor 14 and retrieve 518 a hardware function (i.e., code and/or data for executing the hardware function) associated with the interrupt service routine from the memory 318. The processor 14 may execute 520 the retrieved hardware function. In various aspects, the processor 14 may also retrieve an ancillary function (i.e., code and/or data for executing the ancillary function), associated with the interrupt service routine or with the hardware function, from the memory 318. The processor 14 may execute the retrieved ancillary function.

Figure 5C:
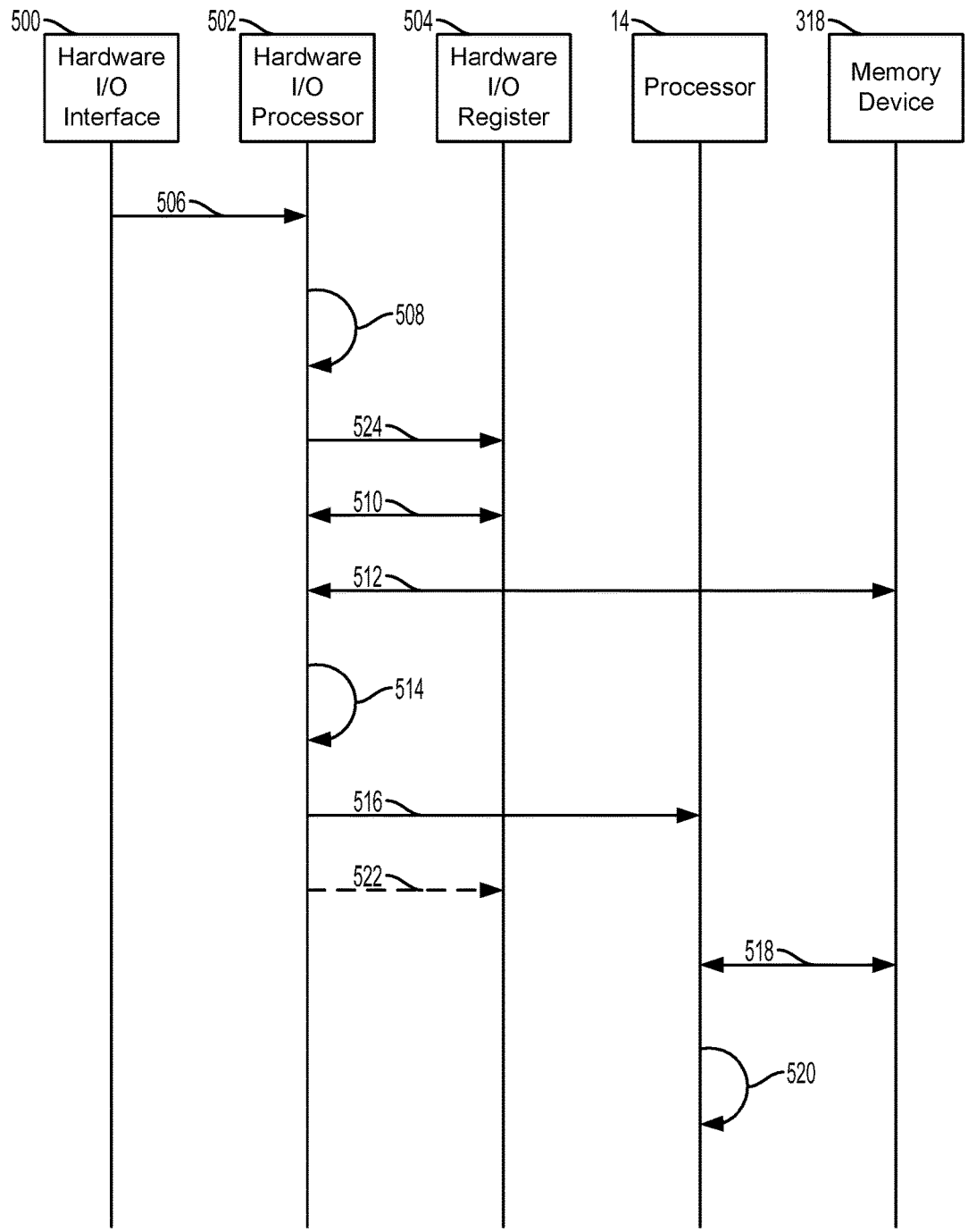

The example illustrated in FIG. 5C represents smart handling of input/output interrupts for a current feature setting level equaling and an adjusted feature setting level not equaling the feature setting level limit. For example, FIG. 5A illustrates operations and signals that may be involved in response to a user adjusting the volume level of a mobile computing device from the minimum volume. In various aspects, the operations and signal 506-520 may be implemented in a similar manner as described herein with reference to the operations and signal 506-520 in FIG. 5A.

A user may actuate the hardware input/output interface 500, and in response to the actuation, the hardware input/output interface 500 may generate and transmit 506 a hardware input/output interrupt signal to the hardware input/output processor 502. The hardware input/output processor 502 may analyze 508 the hardware input/output interrupt signal.

In the example illustrated in FIG. 5C, the comparison of the current feature setting level to the feature setting level limit indicates that the current feature setting level equals the feature setting level limit. This result may prompt the hardware input/output processor 502 to update the adjusted feature setting level and compare the adjusted feature setting level to the feature setting level limit.

Updating the adjusted feature setting level may be accomplished in any manner so that the adjusted feature setting level does not equal the feature setting level limit. In various aspects, updating the adjusted feature setting level may be accomplished by incrementing or decrementing the current feature setting level by an incremental amount or value within the feature setting level limit. In various aspects, updating the adjusted feature setting level may be accomplished by setting the adjusted feature setting level to a value that does not equal the feature setting level limit.

When a comparison of the adjusted feature setting level to the feature setting level limit indicates that the adjusted feature setting level does not equal the feature setting level limit, the hardware input/output processor 502 to modify 524 the data stored at the location in the hardware input/output register 504 associated with an interrupt service routine. In various aspects, modifying 524 the data stored at the location in the hardware input/output register 504 may include changing a Null value and/or an address for a no operation instruction to an address for the interrupt service routine.

The hardware input/output processor 502 may retrieve 510 the address for the interrupt service routine, and may use the address for the interrupt service routine to retrieve 512 the interrupt service routine (i.e., code and/or data for executing the interrupt service routine) from the memory 318. The hardware input/output processor 502 may execute 514 the interrupt service routine, generating a hardware function interrupt configured to prompt the processor 14 to implement the hardware function associated with the interrupt service routine. The hardware input/output processor 502 may transmit 516 the hardware function interrupt to the processor 14.

When a comparison of the current feature setting level to the complement feature setting level limit indicates that the current feature setting level does not equal the complement feature setting level limit, no changes may be made to data stored at a location in the hardware input/output register 504 associated with a complement interrupt service routine. When a comparison of the current feature setting level to the complement feature setting level limit indicates that the current feature setting level equals the complement feature setting level limit, the hardware input/output processor 502 to modify 522 the data stored at the location in the hardware input/output register 504 associated with the complement interrupt service routine. In various aspects, modifying 522 the data stored at the location in the hardware input/output register 504 may include changing a Null value and/or an address for a no operation instruction to an address for a complement interrupt service routine.

In response to receiving the hardware function interrupt, the processor 14 may interrupt or pause any process currently being executed by the processor 14 and retrieve 518 a hardware function (i.e., code and/or data for executing the hardware function) associated with the interrupt service routine from the memory 318. The processor 14 may execute 520 the retrieved hardware function. In various aspects, the processor 14 may also retrieve an ancillary function (i.e., code and/or data for executing the ancillary function), associated with the interrupt service routine or with the hardware function, from the memory 318. The processor 14 may execute the retrieved ancillary function.

Figure 5D:
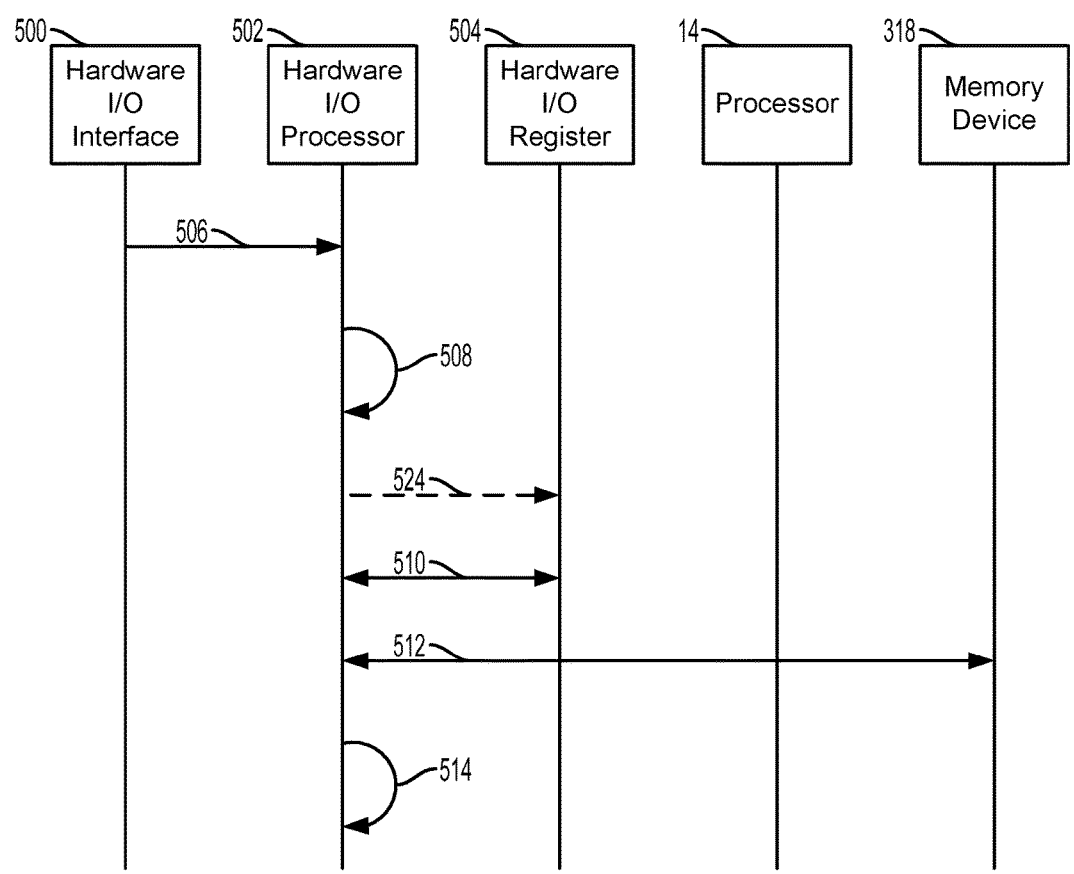

FIG. 5D illustrates an example smart handling of input/output interrupts for a current and adjusted feature setting levels equaling the feature setting level limit according to some aspects. For example, FIG. 5A illustrates operations and signals that may be involved in response to a user adjusting the volume level of a mobile computing device when the volume setting is already at a maximum volume. In various aspects, the operations and signal 506-520 may be implemented in a similar manner as described herein with reference to the operations and signal 506-520 in FIG. 5A.

A user may actuate the hardware input/output interface 500, and in response to the actuation, the hardware input/output interface 500 may generate and transmit 506 a hardware input/output interrupt signal to the hardware input/output processor 502. The hardware input/output processor 502 may analyze 508 the hardware input/output interrupt signal.

In the example illustrated in FIG. 5D, the comparison of the current feature setting level to the feature setting level limit indicates that the current feature setting level equals the feature setting level limit. This result may prompt the hardware input/output processor 502 to update the adjusted feature setting level and compare the adjusted feature setting level to the feature setting level limit.

Updating the adjusted feature setting level may be accomplished in any manner so that the adjusted feature setting level equals the feature setting level limit. In various aspects, updating the adjusted feature setting level may be accomplished by incrementing or decrementing the current feature setting level so that it equals the feature setting level limit. In various aspects, updating the adjusted feature setting level may be accomplished by setting the adjusted feature setting level to a value that equals the feature setting level limit.

When a comparison of the adjusted feature setting level to the feature setting level limit indicates that the adjusted feature setting level equals the feature setting level limit, the hardware input/output processor 502 to modify 524 the data stored at the location in the hardware input/output register 504 associated with an interrupt service routine. In various aspects, modifying 524 the data stored at the location in the hardware input/output register 504 may include changing a Null value and/or an address for a no operation instruction to a Null value and/or an address for a no operation instruction. In various aspects, this result may forego making any changes the data stored at the location in the hardware input/output register 504 associated with an interrupt service routine.

In various aspects, the hardware input/output processor 502 may be configured to recognize whether the hardware function corresponding to the hardware input/output interrupt signal is configured to change the actual feature setting level in a direction that would result in the adjusted feature setting level not equaling the feature setting level limit. In such aspects, the hardware input/output processor 502 may forego updating the adjusted feature setting level.

The hardware input/output processor 502 may retrieve 510 the Null value and/or the address for the no operation, and may use the Null value and/or the address for the no operation instruction to retrieve 512 the no operation instruction (i.e., code and/or data for executing the no operation instruction) from the memory 318. The hardware input/output processor 502 may handle the Null value and/or execute 514 the no operation instruction.

Figure 6A:
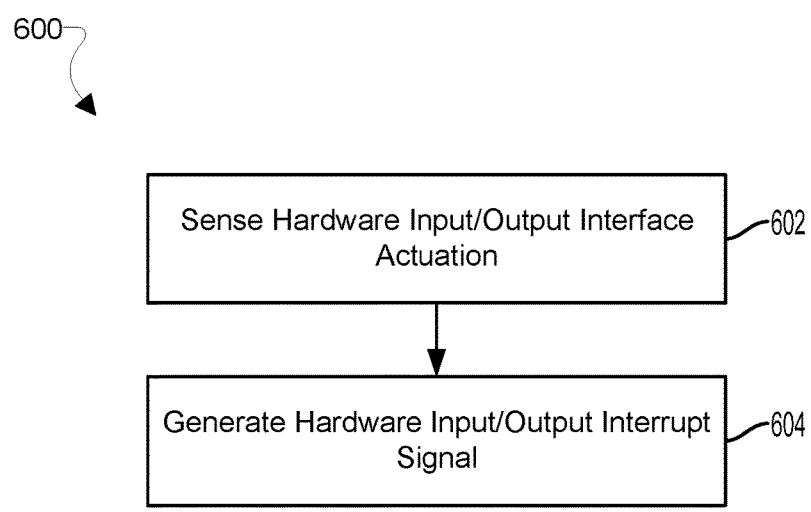
FIG. 6A is a process flow diagram illustrating a method for generating a hardware interrupt signal according to some aspects.

FIG. 6A illustrates a method 600 for generating a hardware input/output interrupt signal according to some aspects. The method 600 may be implemented in a computing device in software executing in a processor (e.g., the processor 14 in FIGS. 1-3 and 5A-5D, the hardware input/output processor 310, 312, 502 in FIGS. 3 and 5A-5D), in general purpose hardware, in dedicated hardware (e.g., the hardware input/output interface 302, 304, 500 in FIGS. 3 and 5A-5D), or in a combination of a software-configured processor and dedicated hardware, such as a processor executing software within a mobile computing device (e.g., the mobile computing device 10, 300 in FIGS. 1 and 3) that includes other individual components (e.g., the memory 16, 24, 318 in FIGS. 1, 3, and 5A-5D, the private cache 210, 212, 214, 216, and the shared cache 230 in FIG. 2, the hardware input/output register 314, 316, 400, 504 in FIGS. 3-5), and various memory/cache controllers. In order to encompass the alternative configurations enabled in the various aspects, the hardware implementing the method 600 is referred to herein as a "processing device." Further, portions of the methods 600, 700, 800, 900, and 1000 in FIGS. 6, 7, 8, 9, and 10 may be implemented in response to, as part of, and in parallel with each other.

In block 602, the processing device may sense a hard input/output interface actuation. For example, a user may interact with a hardware input/output interface (e.g., the hardware input/output interface 302, 304, 500 in FIGS. 3 and 5A-5D) in a manner to actuate the hard input/output interface. Actuating the hard input/output interface may include pressing the hardware input/output interface, touching the hardware input/output interface, connecting a peripheral device wired and/or wireless connector to the hardware input/output interface, making a voice command to the hardware input/output interface, gesturing in front of the hardware input/output interface, and/or moving the hardware input/output interface by moving the mobile computing device.

In block 604, the processing device may generate a hardware input/output interrupt signal. In various aspects, the hardware input/output interrupt signal may be a generic signal that may be interpreted by another processing device, such as a hardware input/output processor (e.g., the hardware input/output processor 310, 312, 502 in FIGS. 3 and 5A-5D), on a basis of an assignment of the other processing device to process interrupt signals from a designated hard input/output interface. In various aspects, the other processing device may be assigned to process hardware input/output interrupt signals from various hard input/output interfaces, and may interpret the hardware input/output interrupt signal based on a pin of the other processing device assigned to a designated hard input/output interface at which the hardware input/output interrupt signal is received. In various aspects, the hardware input/output interrupt signal may be configured to identify the actuated hard input/output interface and/or indicate qualities of the user interaction. Such qualities of the hardware input/output interrupt signal may include qualities of an electrical signal and or data relating to the qualities of the user interaction, including current, voltage, duration, pressure, location, direction, speed, frequency, touch patterns, voice commands, gestures, movements of the mobile computing device, connections of peripheral devices, etc.

Figure 6B:
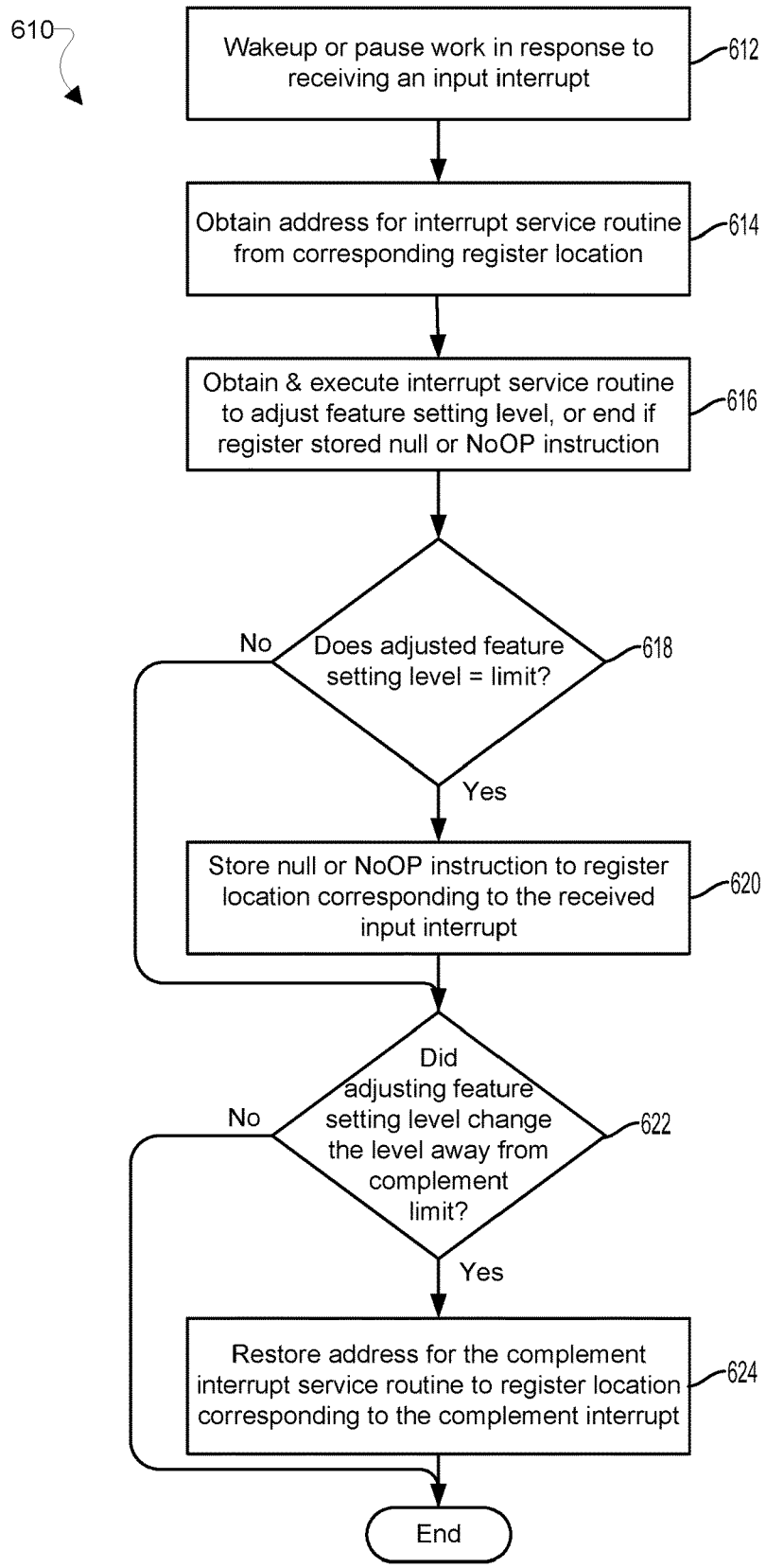
FIG. 6B is a process flow diagram illustrating a method for implementing smart handling of input/output interrupts according to some aspects.

Various aspects may be implemented in a number of different software and/or hardware routines. An example of one method 610 of implementing smart handling of input interrupts is illustrated in FIG. 6B according to some aspects. The method 610 may be implemented in a computing device in software executing in a processor (e.g., the processor 14 in FIGS. 1-3 and 5A-5D). In order to encompass various processors and alternative hardware configurations that may be used to implement the method 610, operations of the method are referred to as being performed by a "processing device."

In block 612, the processing device receiving an input interrupt may wake up or pause other work in order to perform operations corresponding to the received input.

In block 614, the processing device may obtain data stored in a register location corresponding to the received input interrupt. The data stored may be an address for the interrupt service routine corresponding to the received interrupt, but in some circumstances, may be a no value or a no operation instruction. In this operation, the processing device may access the register location that is associated with the particular input interrupt that was received. In some implementations, the received interrupt may identify the register location that the processor access.

In block 616, the processing device may use the address obtained from the register location to obtain the corresponding interrupt service routine from memory, and then execute the interrupt service routine to adjust a feature setting level corresponding to the received input interrupt. For example, if a user pressed a button associated with increasing volume on the mobile computing device (an "up-volume" button), the register location corresponding to the received input interrupt (i.e., the interrupt generated from the button press) may store the address for a service routine that causes the processor to increase the volume level.

If the data obtained from the register location included a null value or a no operation (NoOP) instruction, the processor may terminate processing of the interrupt in block 616. Thus, no operations associated with adjusting feature setting levels or executing associated services (e.g., turning on the display) will be performed in this situation in block 616.

In determination block 618, the processing device may determine whether the adjusted feature setting level is equal to a limit corresponding to the feature. For example, if the user pressed the up-volume button and in response the processing device increase the volume one increment, the processing device may determine whether the adjusted volume is equal to the maximum volume level.

In response to determining that the adjusted feature setting level is equal to the limit corresponding to the feature (i.e., determination block 618="Yes"), the processing device may store a null value or a no operation instruction to the register corresponding to the received input interrupt in block 620. As described, doing so will cause the processing device take no action the next time the same input interrupt is received as described for block 616.

Additionally, or in response to determining that the adjusted feature setting level is not equal to the limit corresponding to the feature (i.e., determination block 618="No"), the processing device may determine whether adjusting the feature setting level changed or moved the level away from a complement feature setting limit in determination block 622. As described, a complement feature setting limit may be a limiting value on the feature setting level that is at an opposite end of a range of permissible settings for the corresponding feature. For example, if the received input interrupt was associated with an up-volume input, then the complement feature setting limit would be the minimum volume setting level. Similarly, the complement feature setting limit for the minimum volume setting level would be the maximum volume setting level. Thus, if the user pressed a button associated with increasing volume on the mobile computing device and in response the processing device increased the volume, the processing device may determine that the adjusted volume is now greater than the minimum volume level. This is because the up-volume interrupt service routine will move the volume level away from the minimum volume level if the volume level was previously at the minimum. Conversely, if the user pressed a button associated with decreasing volume on the mobile computing device and in response the processing device decreased the volume, the processing device may determine that the adjusted volume is now less than the maximum volume level.

In response to determining that adjusting the feature setting level changed the level away from the complement limit (i.e., determination block 622="Yes"), the processing device may restore the address for the complement interrupt service routine in the register location corresponding to the complement interrupt (i.e., the complement of the received interrupt) in block 624. For example, if the processing device increased the volume level and the previous volume setting level was at the minimum (i.e., the complement limit of the up-volume limit), the processing device may store the address for the down-volume service routine in the register address associated with down-volume interrupts. This restores the down-volume service routine to operation for the next down-volume button press because increasing the volume setting level ensured that volume can later be decreased (i.e., the volume setting is greater than the minimum value).

Having restored the complement interrupt service routine to the register or in response to determining that the adjusted feature setting level did not change the level away from the complement limit (i.e., determination block 622="No"), the processing device may end the processing of the received input interrupt.

The operations in blocks 618 through 624 may be included as part of interrupt service routines or may be implemented as part of normal routines for processing input interrupts.

Figure 7:
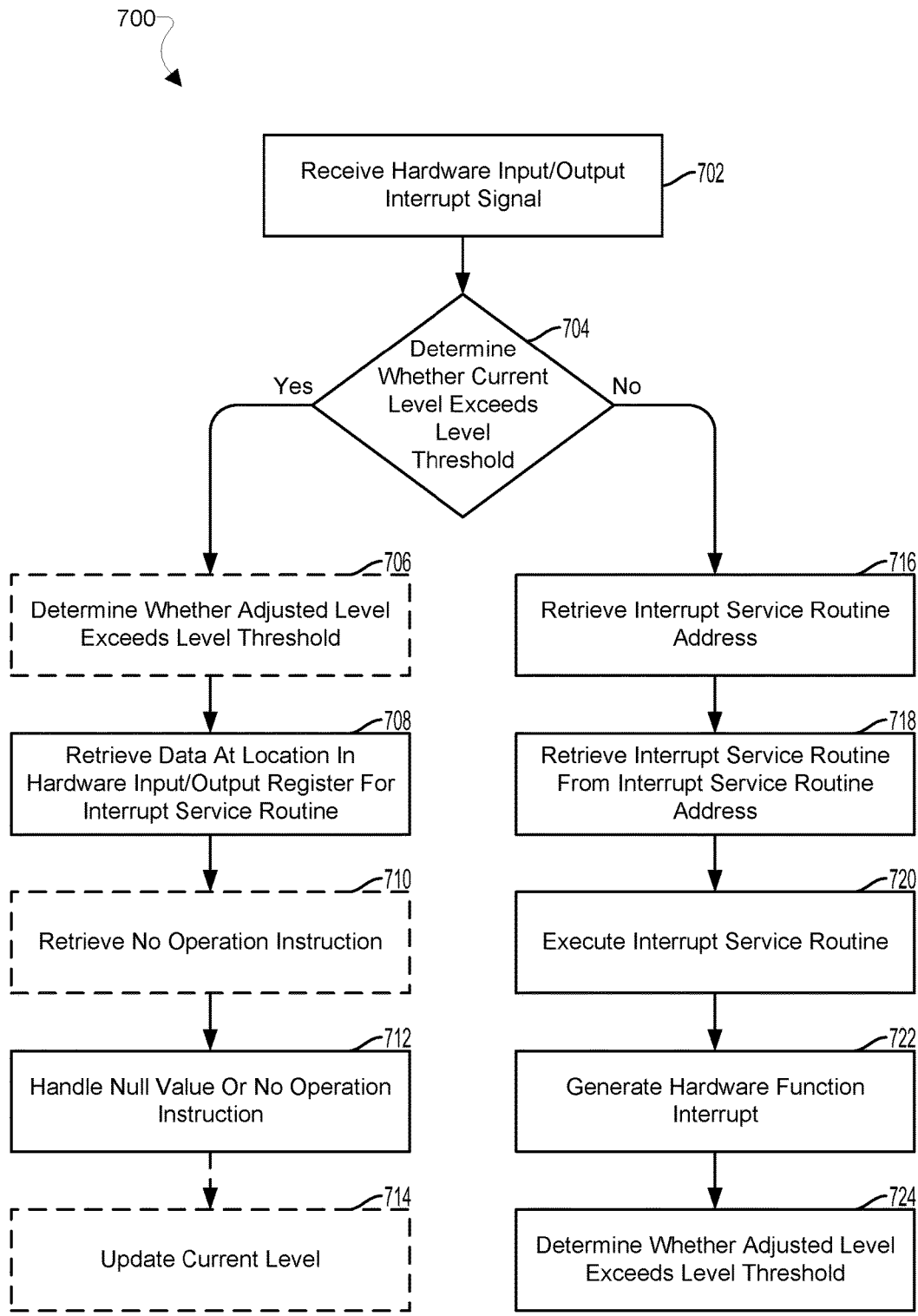
FIG. 7 is a process flow diagram illustrating another method for implementing smart handling of input/output interrupts according to some aspects.

FIG. 7 illustrates another method 700 for implementing smart handling of input interrupts according to some aspects. The method 700 may be implemented in a computing device in software executing in a processor (e.g., the processor 14 in FIGS. 1-3 and 5A-5D, the hardware input/output processor 310, 312, 502 in FIGS. 3 and 5A-5D), in general purpose hardware, in dedicated hardware (e.g., hardware input/output interface 302, 304, 500 in FIGS. 3 and 5A-5D), or in a combination of a software-configured processor and dedicated hardware, such as a processor executing software within a mobile computing device (e.g., mobile computing device 10, 300 in FIGS. 1 and 3) that includes other individual components (e.g., memory 16, 24, 318 in FIGS. 1, 3, and 5A-5D, private cache 210, 212, 214, 216, and shared cache 230 in FIG. 2, hardware input/output register 314, 316, 400, 504 in FIGS. 3-5), and various memory/cache controllers. In order to encompass the alternative configurations enabled in the various aspects, the hardware implementing the method 700 is referred to herein as a "processing device." Further, portions of the methods 600, 610, 700, 800, 900, and 1000 in FIGS. 6, 7, 8, 9, and 10 may be implemented in response to, as part of, and in parallel with each other.

In block 702, the processing device may receive the hardware input/output interrupt signal. In determination block 704, the processing device may determine whether the current feature setting level equals a feature setting level limit. As discussed herein, the feature setting level limit may be a value for which implementing a hardware function to set the feature setting level to a value beyond the feature setting level limit may not affect implementation of the mobile computing device feature.

In response to determining that the current feature setting level equals a feature setting level limit (i.e., determination block 704="Yes"), the processing device may determine whether the adjusted feature setting level equals the feature setting level limit in optional block 706. In various aspects, it may not be necessary to determine whether the adjusted feature setting level equals the feature setting level limit in block 706 for aspects in which the processing device may identify how the hardware function may change the feature setting level. For example, a hardware function may not change the feature setting level that is already equaling the feature setting level limit, or may change the feature setting level to further equal the feature setting level limit. In such aspects, it may be unnecessary to determine whether the adjusted feature setting level equals the feature setting level limit in block 706 because there is no question that the adjusted feature setting level will also equal the feature setting level limit. In various aspects, determine whether the adjusted feature setting level equals the feature setting level limit in optional block 706 may be implemented as described further herein with reference to the method 900 illustrated in FIG. 9.

In block 708, the processing device may retrieve data from a location of the interrupt service routine address in a hardware input/output register (e.g., hardware input/output register 314, 316, 400, 504 in FIGS. 3-5) for an interrupt service routine associated with the hardware input/output interrupt signal. In various aspects, the data may include a Null value and/or an address in a memory (e.g., memory 16, 24, 318 in FIGS. 1, 3, and 5A-5D, private cache 210, 212, 214, 216, and shared cache 230 in FIG. 2) for a no operation instruction. In various aspects, the processing device may identify the interrupt service routine and/or the location of the interrupt service routine based on various factors including an assignment of the processing device or a pin of the processing device to a designated hardware input/output interface (e.g., the hardware input/output interface 302, 304, 500 in FIGS. 3 and 5A-5D) and/or interrupt service routine. In various aspects, the processing device may identify the interrupt service routine and/or the location of the interrupt service routine based on combinations of hardware input/output interrupt signals, and/or information and/or qualities of the hardware input/output interrupt signals.

In optional block 710, the processing device may retrieve the no operation instruction (i.e., code and/or data for the no operation instruction) from the memory. In various aspects, the processing device may not retrieve the no operation instruction when the processing device retrieves the Null value from the location in the hardware input/output register.

In block 712, the processing device may handle the Null value and/or the no operation instruction. In various aspects, the processing device may handle the Null value by proceeding to a next instruction in an instruction queue. In various aspects, the processing device may execute the no operation instruction.

In optional block 714, the processing device may update the current feature setting level. In various aspects, the current feature setting level may be updated to reflect a change in feature setting level associated with actuating the hardware input/output interface. In various aspects, it may not be necessary to update the current feature setting level because the hardware function is not implemented to change the feature setting level.

In response to determining that the current feature setting level does not equal a feature setting level limit (i.e., determination block 704="No"), the processing device may retrieve the interrupt service routine address from a location in the hardware input/output register for an interrupt service routine associated with the hardware input/output interrupt signal in block 716. The processing device may retrieve the interrupt service routine address in block 716 in a similar manner to retrieving data from a location of the interrupt service routine address in the hardware input/output register for the interrupt service routine associated with the hardware input/output interrupt signal in block 708.

In block 718, the processing device may retrieve the interrupt service routine (i.e., code and/or data for the interrupt service routine) from the interrupt service routine address in the memory.

In block 720, the processing device may execute the interrupt service routine retrieved from the interrupt service routine address in the memory.

In block 722, the processing device may generate a hardware function interrupt from the execution of the interrupt service routine. In various aspects, the hardware function interrupt may be configured to prompt another processing device (e.g., the processor 14 in FIGS. 1-3 and 5A-5D) to retrieve and implement a hardware function as described further herein with reference to the method 1000 in FIG. 10.

In block 724, the processing device may determine whether the adjusted feature setting level equals the feature setting level limit. In various aspects, determine whether the adjusted feature setting level equals the feature setting level limit, in block 724, may be implemented as described further herein with reference to the method 900 in FIG. 9. In various aspects, the operations in block 724 may be implemented following and/or in parallel with the operations of any of blocks 718-722.

Figure 8:
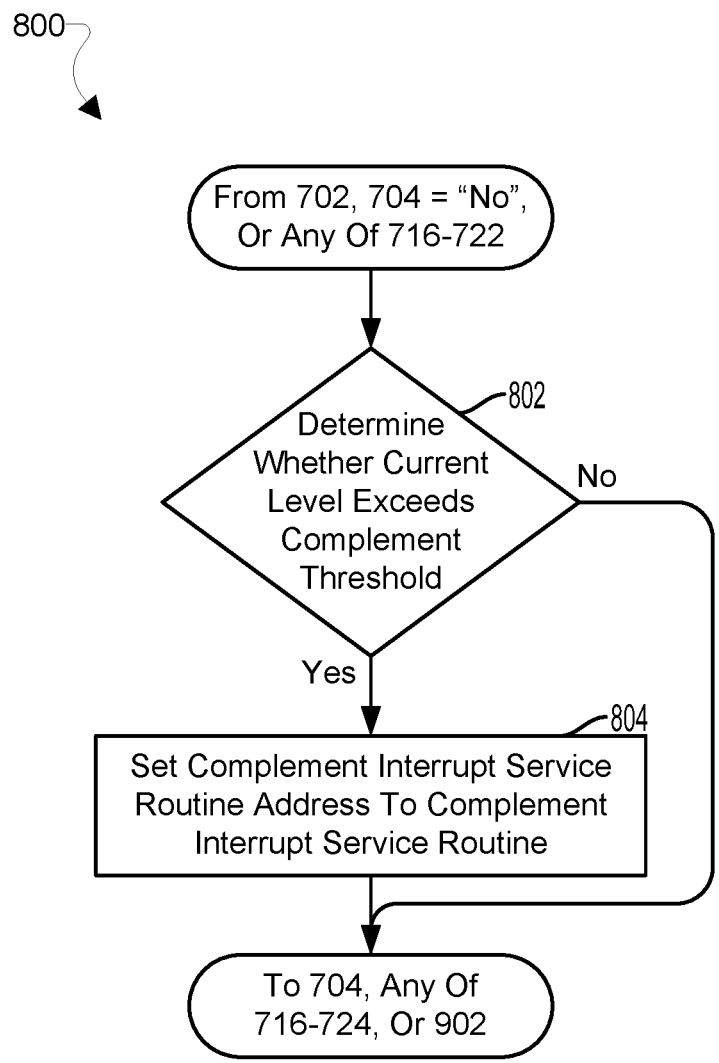
FIG. 8 is a process flow diagram illustrating another method for implementing smart handling of input/output interrupts according to some aspects.

FIG. 8 illustrates a method 800 for implementing smart handling of input/output interrupts according to some aspects. The method 800 may be implemented in a computing device in software executing in a processor (e.g., the processor 14 in FIGS. 1-3 and 5A-5D, the hardware input/output processor 310, 312, 502 in FIGS. 3 and 5A-5D), in general purpose hardware, in dedicated hardware (e.g., hardware input/output interface 302, 304, 500 in FIGS. 3 and 5A-5D), or in a combination of a software-configured processor and dedicated hardware, such as a processor executing software within a mobile computing device (e.g., mobile computing device 10, 300 in FIGS. 1 and 3) that includes other individual components (e.g., memory 16, 24, 318 in FIGS. 1, 3, and 5A-5D, private cache 210, 212, 214, 216, and shared cache 230 in FIG. 2, hardware input/output register 314, 316, 400, 504 in FIGS. 3-5), and various memory/cache controllers. In order to encompass the alternative configurations enabled in the various aspects, the hardware implementing the method 800 is referred to herein as a "processing device." Further, portions of the methods 600, 700, 800, 900, and 1000 in FIGS. 6, 7, 8, 9, and 10 may be implemented in response to, as part of, and in parallel with each other. In various aspects, the method 800 may be implemented following and/or in parallel with blocks 702, determination block 704="No", and/or any of blocks 716-722.

In determination block 802, the processing device may determine whether the current feature setting level equals a complement feature setting level limit. As discussed herein, the complement feature setting level limit may be a feature setting level at or beyond which the feature setting level has no effect on the mobile computing device feature. The complement feature setting level may be at an opposite end of a spectrum of feature setting levels as the feature setting level limit.

In response to determining that the current feature setting level equals a complement feature setting level limit (i.e., determination block 802="Yes"), the processing device may set a location in the hardware input/output register (e.g., hardware input/output register 314, 316, 400, 504 in FIGS. 3-5), corresponding to a complement interrupt service routine, with an address in the memory (e.g., memory 16, 24, 318 in FIGS. 1, 3, and 5A-5D, private cache 210, 212, 214, 216, and shared cache 230 in FIG. 2) for the complement interrupt service routine in block 804. In such an instance, the current feature setting level equaling the complement feature setting level limit may indicate that the feature setting level was set to or beyond a limit prior to the actuation of the hardware input/output interface (e.g., hardware input/output interface 302, 304, 500 in FIGS. 3 and 5A-5D). The current feature setting level equaling the complement feature setting level limit may further indicate that the location in the hardware input/output register for the complement interrupt service routine address is set to Null value and/or an address for a no operation instruction. The actuation of the hardware input/output interface may indicate that the feature setting level is now or will be set to or within the limit, and the location in the hardware input/output register may be changed to the complement interrupt service routine address.

In response to determining that the current feature setting level does not equal a complement feature setting level limit (i.e., determination block 802="No"), the processing device may implement any of blocks 704, 716-724, or 902 depending on which of these blocks has not yet been implemented. In such an instance, the current feature setting level not equaling the complement feature setting level limit may indicate that the feature setting level was set to within the limit prior to the actuation of the hardware input/output interface. The location in the hardware input/output register may already be set the complement interrupt service routine address, and no change to the location in the hardware input/output register may be needed in response to actuation of the hardware input/output interface.

Figure 9:
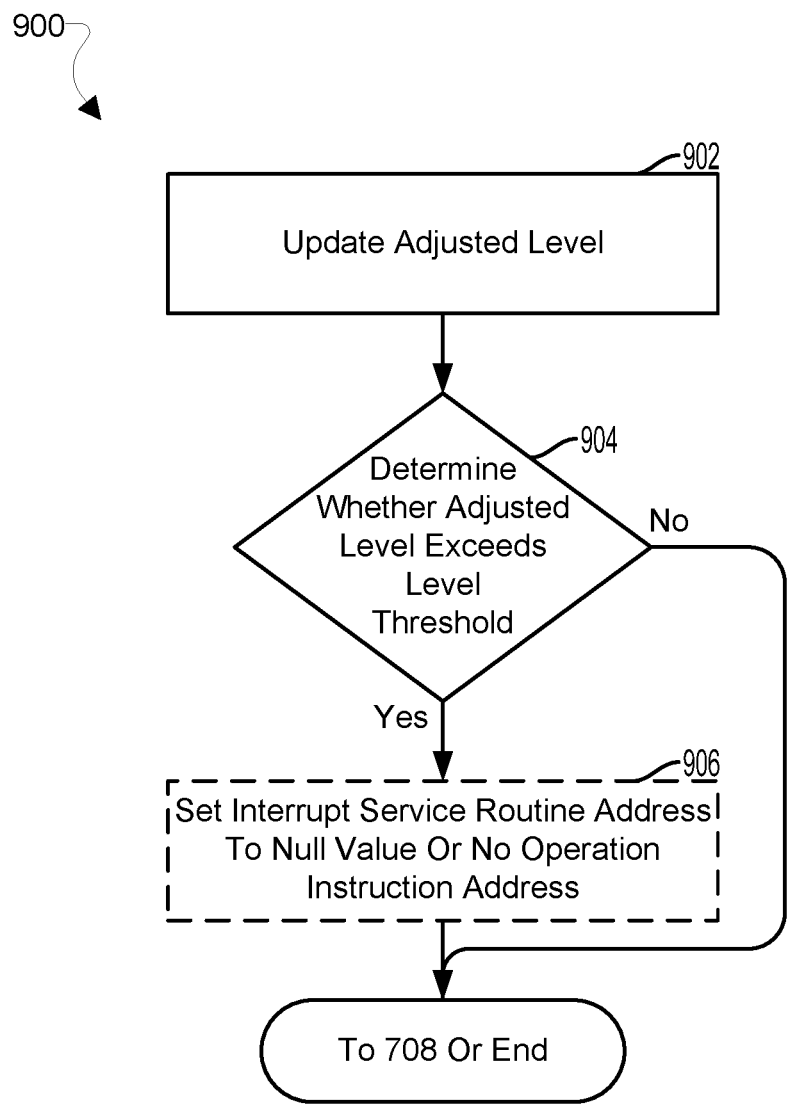
FIG. 9 is a process flow diagram illustrating another method for implementing smart handling of input/output interrupts according to some aspects.

FIG. 9 illustrates a method 900 for implementing smart handling of input/output interrupts according to some aspects. The method 900 may be implemented in a computing device in software executing in a processor (e.g., the processor 14 in FIGS. 1-3 and 5A-5D, the hardware input/output processor 310, 312, 502 in FIGS. 3 and 5A-5D), in general purpose hardware, in dedicated hardware (e.g., hardware input/output interface 302, 304, 500 in FIGS. 3 and 5A-5D), or in a combination of a software-configured processor and dedicated hardware, such as a processor executing software within a mobile computing device (e.g., mobile computing device 10, 300 in FIGS. 1 and 3) that includes other individual components (e.g., memory 16, 24, 318 in FIGS. 1, 3, and 5A-5D, private cache 210, 212, 214, 216, and shared cache 230 in FIG. 2, hardware input/output register 314, 316, 400, 504 in FIGS. 3-5), and various memory/cache controllers. In order to encompass the alternative configurations enabled in the various aspects, the hardware implementing the method 900 is referred to herein as a "processing device." Further, portions of the methods 600, 700, 800, 900, and 1000 in FIGS. 6, 7, 8, 9, and 10 may be implemented in response to, as part of, and in parallel with each other. In various aspects, the method 900 may further describe optional block 706 and block 724 in FIG. 7.

In block 902, the processing device may update an adjusted feature setting level. In various aspects, updating the adjusted feature setting level may be accomplished by incrementing or decrementing the current feature setting level so that it equals the feature setting level limit. In various aspects, such as implementing the method 900 as part of block 724 in FIG. 7, updating the adjusted feature setting level may be accomplished by setting the adjusted feature setting level to a value that does not equal the feature setting level limit. In various aspects, such as implementing the method 900 as part of optional block 706 and/or block 724 in FIG. 7, updating the adjusted feature setting level may be accomplished by setting the adjusted feature setting level to a value that equals the feature setting level limit.

In determination block 904, the processing device may determine whether the adjusted feature setting level equals a feature setting level limit.

In response to determining that the adjusted feature setting level equals a feature setting level limit (i.e., determination block 904="Yes"), the processing device may set a location in the hardware input/output register (e.g., hardware input/output register 314, 316, 400, 504 in FIGS. 3-5), corresponding to an interrupt service routine, with a Null value and/or an address in the memory (e.g., memory 16, 24, 318 in FIGS. 1, 3, and 5A-5D, private cache 210, 212, 214, 216, and shared cache 230 in FIG. 2) for a no operation instruction in optional block 906. Circumstances in which the current feature setting level equals the feature setting level limit (i.e., determination block 704 in FIG. 7="No"), may occur when the feature setting level was set to a limit prior to the actuation of the hardware input/output interface (e.g., hardware input/output interface 302, 304, 500 in FIGS. 3 and 5A-5D). The current feature setting level equaling the feature setting level limit may further indicate that the location in the hardware input/output register for the interrupt service routine address is set to Null value and/or an address for a no operation instruction, and not modification of the location in the hardware input/output register is needed. In various aspects, the optional block 906 may not be implemented in response to the processing device determining that the location in the hardware input/output register does not need to be changed because the stored data is already correct.

In response to determining that the adjusted feature setting level does not equal a feature setting level limit (i.e., determination block 904="No"), the processing device may implement block 708 in FIG. 7 and/or end implementation of the method 900. In various aspects, such as implementing the method 900 as part of optional block 706 in FIG. 7, the processing device may implement block 708 in FIG. 7. In various aspects, such as implementing the method 900 as part of optional block 724 in FIG. 7, the processing device may end implementation of the method 900.

Figure 10:
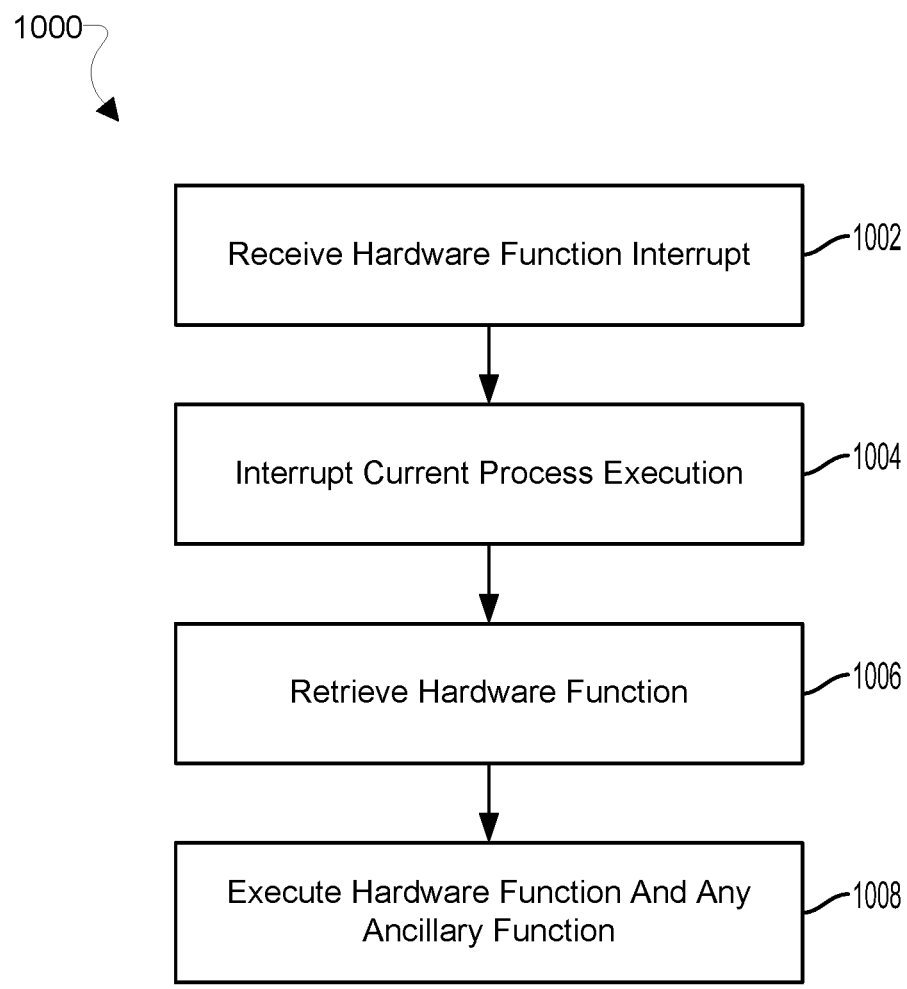
FIG. 10 a process flow diagram illustrating another method for executing a hardware function according to some aspects.

FIG. 10 illustrates a method 1000 for executing a hardware function according to some aspects. The method 1000 may be implemented in a computing device in software executing in a processor (e.g., the processor 14 in FIGS. 1-3 and 5A-5D, the hardware input/output processor 310, 312, 502 in FIGS. 3 and 5A-5D), in general purpose hardware, in dedicated hardware (e.g., hardware input/output interface 302, 304, 500 in FIGS. 3 and 5A-5D), or in a combination of a software-configured processor and dedicated hardware, such as a processor executing software within a mobile computing device (e.g., mobile computing device 10, 300 in FIGS. 1 and 3) that includes other individual components (e.g., memory 16, 24, 318 in FIGS. 1, 3, and 5A-5D, private cache 210, 212, 214, 216, and shared cache 230 in FIG. 2, hardware input/output register 314, 316, 400, 504 in FIGS. 3-5), and various memory/cache controllers. In order to encompass the alternative configurations enabled in the various aspects, the hardware implementing the method 1000 is referred to herein as a "processing device." Further, portions of the methods 600, 700, 800, 900, and 1000 in FIGS. 6, 7, 8, 9, and 10 may be implemented in response to, as part of, and in parallel with each other.

In block 1002, the processing device may receive a hardware function interrupt. As described herein, the hardware function interrupt may be configured to prompt the processing device to retrieve and implement a hardware function. In various aspects, the hardware function interrupt may be a generic interrupt that may be interpreted by the processing device on a basis of an assignment of a pin of the processing device to process hardware function interrupts from a designated other processor, such as a hardware input/output processor (e.g., hardware input/output processor 310, 312, 502 in FIGS. 3 and 5A-5D). In various aspects, the hardware function interrupt may be configured to identify the hardware function and/or location of the hardware function in a memory (e.g., memory 16, 24, 318 in FIGS. 1, 3, and 5A-5D, private cache 210, 212, 214, 216, and shared cache 230 in FIG. 2).

In block 1004, the processing device may interrupt a process currently being executed buy the processing device. In various aspects, the processing device may effectively pause execution of the current process until completion of the hardware function corresponding to the hardware function interrupt. The processing device may store a state of execution of the current process and/or data for executing the current process for later continuation of execution of the current process, such as, upon completion of the hardware function.

In block 1006, the processing device may retrieve the hardware function. As discussed herein, the processing device may identify the hardware function and/or an address in the memory for the hardware function from the hardware function interrupt. In various aspects, the hardware function interrupt may contain data for identifying the hardware function, and/or the address for the hardware function in the memory. In various aspects, the processing device may use the data for identifying the hardware function to identify the hardware function, and use the identification of the hardware function to obtain the address of the hardware function from a record associating the hardware function and the address of the hardware function in the memory. The processing device may use the address for the hardware function in memory to retrieve the hardware function (i.e., code and/or data for executing the hardware function). In various aspects, the hardware function interrupt may similarly identify and/or be used to identify an ancillary function, and may retrieve the ancillary function (i.e., code and/or data for executing the ancillary function).

In block 1008, the processing device may execute the hardware function and any ancillary function. In various aspects, the processing device may execute the hardware function and any ancillary function using the code and/or data for each of the hardware function and any ancillary function retrieved from the memory. In various aspects, executing the hardware function may result in calling and executing the ancillary functions.

Figure 11:
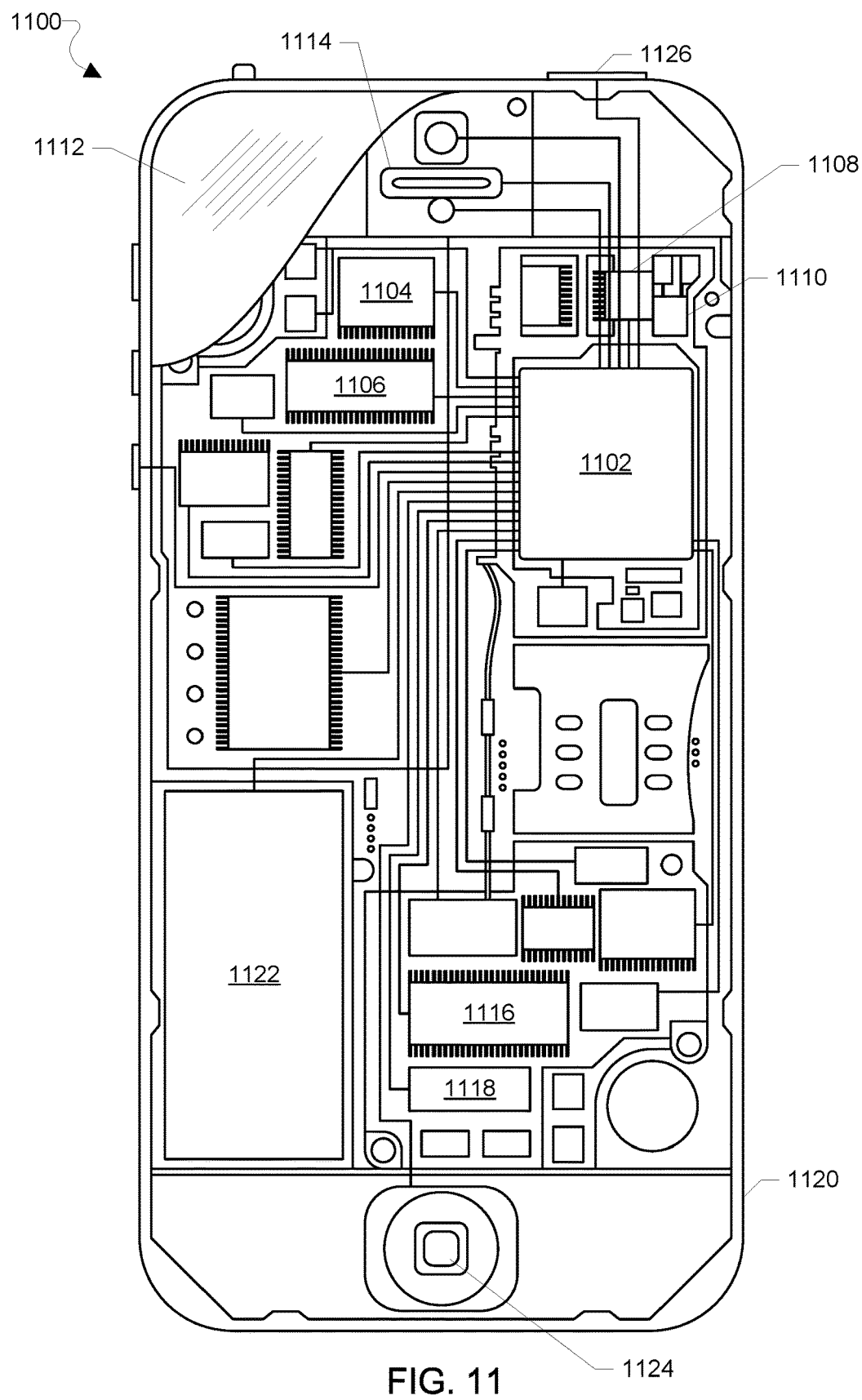
FIG. 11 is a component block diagram illustrating an example mobile computing device suitable for use with the various aspects.

The various aspects (including, but not limited to, aspects described above with reference to FIGS. 1-10) may be implemented in a wide variety of computing systems including mobile computing devices, an example of which suitable for use with the various aspects is illustrated in FIG. 11. The mobile computing device 1100 may include a processor 1102 coupled to a touchscreen controller 1104 and an internal memory 1106. The processor 1102 may be one or more multicore integrated circuits designated for general or specific processing tasks. The internal memory 1106 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the computing device 1100 need not have touch screen capability.

The mobile computing device 1100 may have one or more radio signal transceivers 1108 (e.g., Peanut, Bluetooth, ZigBee, Wi-Fi, RF radio) and antennae 1110, for sending and receiving communications, coupled to each other and/or to the processor 1102. The transceivers 1108 and antennae 1110 may be used with the above-mentioned circuitry to implement the various wireless transmission protocol stacks and interfaces. The mobile computing device 1100 may include a cellular network wireless modem chip 1116 that enables communication via a cellular network and is coupled to the processor.

The mobile computing device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as Universal Serial Bus (USB), FireWire, Thunderbolt, or PCIe. The peripheral device connection interface 1118 may also be coupled to a similarly configured peripheral device connection port (not shown).

The mobile computing device 1100 may also include speakers 1114 for providing audio outputs. The mobile computing device 1100 may also include a housing 1120, constructed of a plastic, metal, or a combination of materials, for containing all or some of the components described herein. The mobile computing device 1100 may include a power source 1122 coupled to the processor 1102, such as a disposable or rechargeable battery. The rechargeable battery may also be coupled to the peripheral device connection port to receive a charging current from a source external to the mobile computing device 1100. The mobile computing device 1100 may also include a physical button 1124 for receiving user inputs. The mobile computing device 1100 may also include a power button 1126 for turning the mobile computing device 1100 on and off.

Figure 12:
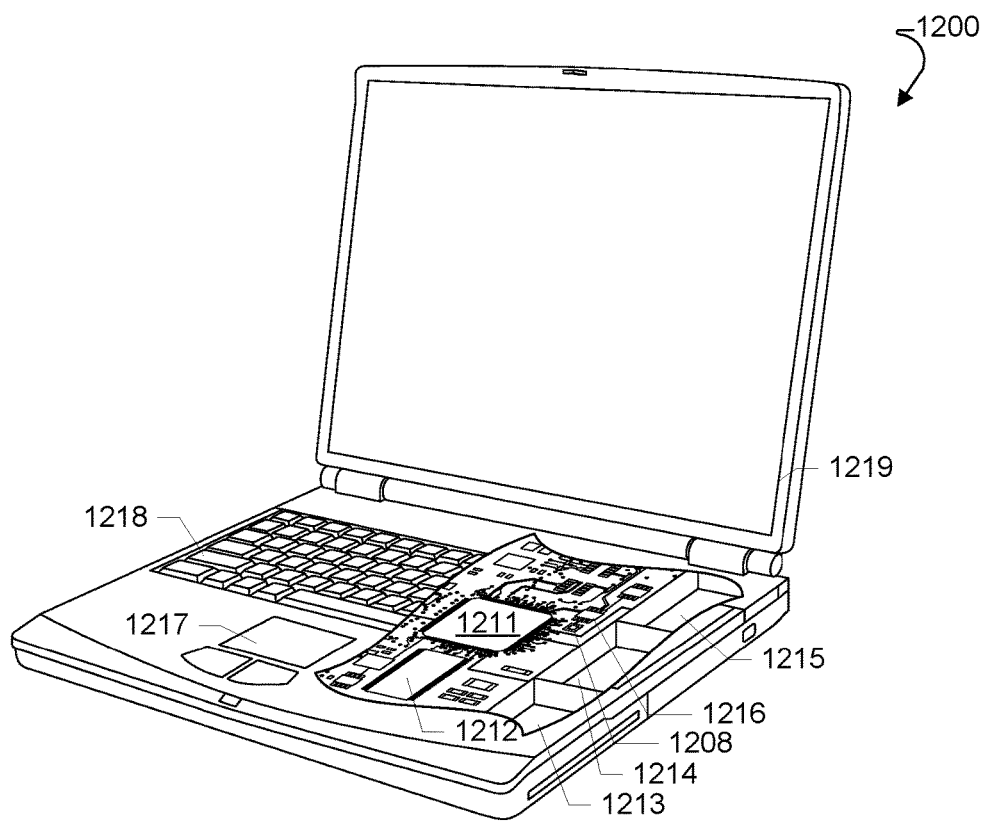
FIG. 12 is a component block diagram illustrating an example mobile computing device suitable for use with the various aspects.

The various aspects (including, but not limited to, aspects described above with reference to FIGS. 1-10) may be implemented in a wide variety of computing systems include a laptop computer 1200 an example of which is illustrated in FIG. 12. Many laptop computers include a touchpad touch surface 1217 that serves as the computer's pointing device, and thus may receive drag, scroll, and flick gestures similar to those implemented on computing devices equipped with a touch screen display and described above. A laptop computer 1200 will typically include a processor 1211 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the processor 1211. The computer 1200 may also include a floppy disc drive 1214 and a compact disc (CD) drive 1215 coupled to the processor 1211. In a notebook configuration, the computer housing includes the touchpad 1217, the keyboard 1218, and the display 1219 all coupled to the processor 1211. Other configurations of the computing device may include a computer mouse or trackball coupled to the processor (e.g., via a USB input) as are well known, which may also be used in conjunction with the various aspects.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects and implementations without departing from the scope of the claims. Thus, the present disclosure is not intended to be limited to the aspects and implementations described herein, but is to be accorded the widest scope consistent with the following claims and the principles and novel features disclosed herein.

What is claimed is:

1. A method of smart handling input/output interrupts on a mobile computing device, comprising:
    determining whether an adjusted feature setting level of a feature setting of the mobile computing device equals a first feature setting level limit; and
    storing a null or no operation instruction at a first location of a hardware input/output register corresponding with an interrupt service routine associated with a hardware input/output interrupt in response to determining that the adjusted feature setting level of the mobile computing device equals the first feature setting level limit.

2. The method of claim 1, further comprising changing data stored at the first location of the hardware input/output register to the interrupt service routine address in response to determining that the adjusted feature setting level of the mobile computing device no longer equals the first feature setting level limit.

3. The method of claim 1, wherein changing data stored at the first location of the hardware input/output register to the interrupt service routine address in response to determining that the adjusted feature setting level of the mobile computing device no longer equals the first feature setting level limit comprises:
    determining whether the adjusted feature setting level moved away from a complement feature setting limit that is on an opposite end of a permissible feature setting level range from the first feature setting level limit; and
    storing an address for a complement interrupt service routine corresponding to the feature setting in a second location of the hardware input/output register corresponding to interrupts for the complement interrupt service routine in response to determining that the adjusted feature setting level moved away from the complement feature setting limit.

4. The method of claim 1, further comprising:
    retrieving data stored at the first location of the hardware input/output register;
    performing no operation if a null or no operation instruction is stored in the first location of the hardware input/output register;
    retrieving the interrupt service routine from memory using an interrupt service routine address if stored in the first location of the hardware input/output register; and
    executing the interrupt service routine to adjust a setting to the adjusted feature setting level.

5. The method of claim 4, further comprising executing an ancillary function in conjunction with executing the interrupt service routine.

6. A mobile computing device, comprising:
    a processor having a hardware input/output register, the processor configured to perform operations comprising:
        determining whether an adjusted feature setting level of a feature setting equals a first feature setting level limit; and
        storing a null or no operation instruction at a first location of the hardware input/output register corresponding with an interrupt service routine associated with a hardware input/output interrupt in response to determining that the adjusted feature setting level equals the first feature setting level limit.

7. The mobile computing device of claim 6, wherein the processor is configured to perform operations further comprising changing data stored at the first location of the hardware input/output register to the interrupt service routine address in response to determining that the adjusted feature setting level no longer equals the first feature setting level limit.

8. The mobile computing device of claim 6, wherein the processor is configured to perform operations such that changing data stored at the first location of the hardware input/output register to the interrupt service routine address in response to determining that the adjusted feature setting level no longer equals the first feature setting level limit comprises:
    determining whether the adjusted feature setting level moved away from a complement feature setting limit that is on an opposite end of a permissible feature setting level range from the first feature setting level limit; and
    storing an address for a complement interrupt service routine corresponding to the feature setting in a second location of the hardware input/output register corresponding to interrupts for the complement interrupt service routine in response to determining that the adjusted feature setting level moved away from the complement feature setting limit.

9. The mobile computing device of claim 6, wherein the processor is configured to perform operations further comprising:
    retrieving data stored at the first location of the hardware input/output register;
    performing no operation if a null or no operation instruction is stored in the first location of the hardware input/output register;
    retrieving the interrupt service routine from memory using an interrupt service routine address if stored in the first location of the hardware input/output register; and
    executing the interrupt service routine to adjust a setting to the adjusted feature setting level.

10. The mobile computing device of claim 9, wherein the processor is configured to perform operations further comprising executing an ancillary function in conjunction with executing the interrupt service routine.

11. A mobile computing device, comprising:
    means for determining whether an adjusted feature setting level of a feature setting equals a first feature setting level limit; and
    means for storing a null or no operation instruction at a first location of a hardware input/output register corresponding with an interrupt service routine associated with a hardware input/output interrupt in response to determining that the adjusted feature setting level equals the first feature setting level limit.

12. The mobile computing device of claim 11, further comprising means for changing data stored at the first location of the hardware input/output register to the interrupt service routine address in response to determining that the adjusted feature setting level no longer equals the first feature setting level limit.

13. The mobile computing device of claim 11, wherein means for changing data stored at the first location of the hardware input/output register to the interrupt service routine address in response to determining that the adjusted feature setting level no longer equals the first feature setting level limit comprises:
   means for determining whether the adjusted feature setting level moved away from a complement feature setting limit that is on an opposite end of a permissible feature setting level range from the first feature setting level limit; and
   means for storing an address for a complement interrupt service routine corresponding to the feature setting in a second location of the hardware input/output register corresponding to interrupts for the complement interrupt service routine in response to determining that the adjusted feature setting level moved away from the complement feature setting limit.

14. The mobile computing device of claim 11, further comprising:
   means for retrieving data stored at the first location of the hardware input/output register;
   means for performing no operation if a null or no operation instruction is stored in the first location of the hardware input/output register;
   means for retrieving the interrupt service routine from memory using an interrupt service routine address if stored in the first location of the hardware input/output register; and
   means for executing the interrupt service routine to adjust a setting to the adjusted feature setting level.

15. The mobile computing device of claim 14, further comprising means for executing an ancillary function in conjunction with executing the interrupt service routine.

16. A non-transitory processor-readable storage medium having stored thereon processor-executable instructions configured to cause a processor of a mobile computing device to perform operations comprising:
   determining whether an adjusted feature setting level of a feature setting equals a first feature setting level limit; and
   storing a null or no operation instruction at a first location of a hardware input/output register corresponding with an interrupt service routine associated with a hardware input/output interrupt in response to determining that the adjusted feature setting level equals the first feature setting level limit.

17. The non-transitory processor-readable storage medium of claim 16, wherein the stored processor-executable instructions are configured to cause a processor of a mobile computing device to perform operations further comprising changing data stored at the first location of the hardware input/output register to the interrupt service routine address in response to determining that the adjusted feature setting level no longer equals the first feature setting level limit.

18. The non-transitory processor-readable storage medium of claim 16, wherein the stored processor-executable instructions are configured to cause a processor of a mobile computing device to perform operations such that changing data stored at the first location of the hardware input/output register to the interrupt service routine address in response to determining that the adjusted feature setting level no longer equals the first feature setting level limit comprises:
   determining whether the adjusted feature setting level moved away from a complement feature setting limit that is on an opposite end of a permissible feature setting level range from the first feature setting level limit; and
   storing an address for a complement interrupt service routine corresponding to the feature setting in a second location of the hardware input/output register corresponding to interrupts for the complement interrupt service routine in response to determining that the adjusted feature setting level moved away from the complement feature setting limit.

19. The non-transitory processor-readable storage medium of claim 16, wherein the stored processor-executable instructions are configured to cause a processor of a mobile computing device to perform operations further comprising:
   retrieving data stored at the first location of the hardware input/output register;
   performing no operation if a null or no operation instruction is stored in the first location of the hardware input/output register;
   retrieving the interrupt service routine from memory using an interrupt service routine address if stored in the first location of the hardware input/output register; and
   executing the interrupt service routine to adjust a setting to the adjusted feature setting level.

20. The non-transitory processor-readable storage medium of claim 19, wherein the stored processor-executable instructions are configured to cause a processor of a mobile computing device to perform operations further comprising executing an ancillary function in conjunction with executing the interrupt service routine.

* * * * *